(12) United States Patent
Wu et al.

(10) Patent No.: US 11,861,728 B2
(45) Date of Patent: *Jan. 2, 2024

(54) TECHNOLOGY FOR BUILDING AND MANAGING DATA MODELS

(71) Applicant: STATE FARM MUTUAL AUTOMOBILE INSURANCE COMPANY, Bloomington, IL (US)

(72) Inventors: Weixin Wu, Bloomington, IL (US); Philip Sangpil Moon, Bloomington, IL (US); Scott Farris, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/886,059

(22) Filed: Aug. 11, 2022

(65) Prior Publication Data

US 2022/0383039 A1 Dec. 1, 2022

Related U.S. Application Data

(63) Continuation of application No. 15/977,618, filed on May 11, 2018, now Pat. No. 11,468,263.

(Continued)

(51) Int. Cl.
*G06V 10/00* (2022.01)
*G06Q 40/08* (2012.01)
(Continued)

(52) U.S. Cl.
CPC ............... *G06Q 40/08* (2013.01); *G06F 8/35* (2013.01); *G06F 16/904* (2019.01); *G06F 17/18* (2013.01);
(Continued)

(58) Field of Classification Search
CPC .. G06K 9/6253; G06K 9/6261; G06K 9/6265; G06K 9/6255; G06K 9/66; G06K 9/4628; G06K 9/00228; G06K 9/38; G06N 7/005; G06N 20/00; G06Q 40/08; G06F 17/30249; G06F 17/18; G06F 16/21;
(Continued)

(56) References Cited

U.S. PATENT DOCUMENTS 6,347,310 B1   2/2002   Passera
6,373,489 B1 *  4/2002   Lu ........................... G06T 17/05
                                                          345/428

(Continued)

*Primary Examiner* — Amir Alavi
(74) *Attorney, Agent, or Firm* — MARSHALL, GERSTEIN & BORUN LLP

(57) ABSTRACT

Techniques for building and managing data models are provided. According to certain aspects, systems and methods may enable a user to input parameters associated with building one or more data models, including parameters associated with sampling, binning, and other factors. The systems and methods may automatically generate program code that corresponds to the inputted parameters and display the program code for review by the user. The systems and methods may build the data models and generate charts and plots depicting aspects of the data models. Additionally, the systems and methods may combine data models and select champion data models.

20 Claims, 21 Drawing Sheets

Related U.S. Application Data

(60) Provisional application No. 62/633,859, filed on Feb. 22, 2018, provisional application No. 62/632,679, filed on Feb. 20, 2018, provisional application No. 62/621,784, filed on Jan. 25, 2018, provisional application No. 62/615,286, filed on Jan. 9, 2018, provisional application No. 62/592,975, filed on Nov. 30, 2017, provisional application No. 62/589,444, filed on Nov. 21, 2017.

(51) Int. Cl.
   *G06F 8/35* (2018.01)
   *G06F 17/18* (2006.01)
   *G06F 16/904* (2019.01)
   *G06N 20/00* (2019.01)
   *G06F 18/40* (2023.01)
   *G06F 18/21* (2023.01)
   *G06N 7/01* (2023.01)

(52) U.S. Cl.
   CPC ...... *G06F 18/2163* (2023.01); *G06F 18/2193* (2023.01); *G06F 18/40* (2023.01); *G06N 7/01* (2023.01); *G06N 20/00* (2019.01)

(58) Field of Classification Search
   CPC ........... G06F 16/2465; G06F 16/24554; G06F 16/24578; G06F 16/904; G06F 18/2163; G06F 18/2193; G06F 18/40; G06F 8/35; G06T 7/0081; G06T 7/0083; G06T 2207/20144; G06T 2207/10016
   See application file for complete search history.

(56) References Cited

U.S. PATENT DOCUMENTS

| | | | |
|---|---|---|---|
| 7,574,339 B2 * | 8/2009 | Lukis | G06F 30/327 700/197 |
| 7,756,881 B2 * | 7/2010 | Crivat | G06F 16/2465 707/754 |
| 7,835,911 B2 * | 11/2010 | Balchandran | G06F 40/237 704/275 |
| 8,311,967 B1 | 11/2012 | Lin et al. | |
| 8,370,279 B1 | 2/2013 | Lin et al. | |
| 8,473,431 B1 | 6/2013 | Mann et al. | |
| 8,489,632 B1 | 7/2013 | Breckenridge et al. | |
| 8,554,703 B1 | 10/2013 | Lin et al. | |
| 8,812,276 B2 * | 8/2014 | Aldrich | G06F 11/3608 703/2 |
| 9,501,749 B1 | 11/2016 | Narsky | |
| 9,798,782 B2 * | 10/2017 | Dagli | G06F 16/212 |
| 10,152,676 B1 | 12/2018 | Strom | |
| 10,719,645 B1 * | 7/2020 | Zhang | G06F 30/3323 |
| 10,733,515 B1 | 8/2020 | Mishra et al. | |
| 10,733,754 B2 * | 8/2020 | Dayanandan | G06F 8/35 |
| 10,943,301 B1 * | 3/2021 | Wu | G06F 18/2163 |
| 11,176,480 B2 * | 11/2021 | Mozes | G06F 16/278 |
| 11,468,263 B1 * | 10/2022 | Wu | G06F 18/40 |
| 2011/0295578 A1 * | 12/2011 | Aldrich | G06F 11/3664 703/6 |

* cited by examiner

600 — Angela.cpf ×
Angela > C_Modeler_Angela0929
Settings | Code/Results | Split 601 (tabs): DATA | ACTION | EDA | SELECTION | GLM | ▶
Log | Code

▲ACTION
▲DATA
Do you want to run EDA on the entire dataset or only the training dataset?
● Only use the training dataset
○ Use the entire dataset
▲UNIVARIATE ANALYSIS
Univariate analysis is performed on all CLASS and continuous variables selected in the DATA Tab.
▲INTERACTION DETECTION
(Under development)
▲OUTPUT
Results will be automatically saved as "EDA.html" in the corresponding FREQ/SEV/PP folder.

605 — CODE | LOG | RESULTS
▶ Table of contents

EDA on R_AFD_IND_RRT_CONV

| R_AFD_IND_RRT_CONV | Avg FREQ By Level | Avg FREQ (Overall) | % of Weight |
|---|---|---|---|
| N | 0.13815 | 0.030007 | 4.43% |
| Y | 0.02500 | 0.030007 | 95.6% |

EDA on R_MULTICAR_IND

| R_MULTICAR_IND | Avg FREQ By Level | Avg FREQ (Overall) | % of Weight |
|---|---|---|---|
| N | 0.034614 | 0.030007 | 19.9% |
| Y | 0.028860 | 0.030007 | 80.1% |

EDA on R_MLD

| R_MLD | Avg FREQ By Level | Avg FREQ (Overall) | % of Weight |
|---|---|---|---|
| 0.NO MLD | 0.032516 | 0.030007 | 13.6% |
| 1.HEALTH | 0.022590 | 0.030007 | 0.22% |
| 1.L<125 | 0.030592 | 0.030007 | 1.43% |
| 1.L>=125 | 0.035168 | 0.030007 | 0.31% |
| 2.MAHO | 0.022587 | 0.030007 | 0.76% |
| 2.RENT | 0.036125 | 0.030007 | 8.31% |
| 3.MAHO-P | 0.027762 | 0.030007 | 0.02% |
| 3.RENT-P | 0.031364 | 0.030007 | 0.28% |
| 4.COND | 0.033147 | 0.030007 | 5.23% |
| 4.FARM | 0.015993 | 0.030007 | 0.20% |
| 4.HOME | 0.028822 | 0.030007 | 58.7% |
| 5.COND-P | 0.029860 | 0.030007 | 0.73% |
| 5.FARM-P | 0.014772 | 0.030007 | 0.11% |
| 5.HOME-P | 0.027762 | 0.030007 | 10.1% |

Messages: 2    User: uz28

TECHNOLOGY FOR BUILDING AND MANAGING DATA MODELS

CROSS-REFERENCE TO RELATED APPLICATIONS

This application is a continuation application of U.S. patent application Ser. No. 15/977,618 (filed May 11, 2018 and entitled "TECHNOLOGY FOR BUILDING AND MANAGING DATA MODELS"), which claims benefit of the filing dates of U.S. Provisional Patent Application No. 62/589,444 (filed Nov. 21, 2017 and entitled "TECHNOLOGY FOR BUILDING AND MANAGING DATA MODELS"); U.S. Provisional Patent Application No. 62/592,975 (filed Nov. 30, 2017 and entitled "TECHNOLOGY FOR BUILDING AND MANAGING DATA MODELS"); U.S. Provisional Patent Application No. 62/615,286 (filed Jan. 9, 2018 and entitled "TECHNOLOGY FOR BUILDING AND MANAGING DATA MODELS"); U.S. Provisional Patent Application No. 62/621,784 (filed Jan. 25, 2018 and entitled "TECHNOLOGY FOR BUILDING AND MANAGING DATA MODELS"); U.S. Provisional Patent Application No. 62/632,679 (filed Feb. 20, 2018 and entitled "TECHNOLOGY FOR BUILDING AND MANAGING DATA MODELS"); and U.S. Provisional Patent Application No. 62/633,859 (filed Feb. 22, 2018 and entitled "TECHNOLOGY FOR BUILDING AND MANAGING DATA MODELS")—which are hereby incorporated by reference in their entireties.

TECHNICAL FIELD

This disclosure relates generally to building and managing data models and, in particular, to enabling users to effectively specify various parameters associated with data modeling and presenting results of the data modeling within a specified and managed approach.

BACKGROUND

Data modeling is the process of creating one or more data models using statistical and data science techniques. Predictive modeling is a type of data modeling that uses those techniques to forecast outcomes, where a data model may be made up of a set of predictors that influence the data model output. Predictive modeling serves many applications, including uplift modeling, archaeology, customer relationship management, health care, algorithmic trading, and insurance. Further, predictive modeling incorporates various techniques, including naïve Bayes classifiers, k-nearest neighbor algorithms, majority classifiers, support vector machines, random forests, boosted trees, classification and regression trees (CARD), multivariate adaptive regression splines (MARS), neural networks, ordinary least squares, generalized linear models (GLM), logistic regression, generalized additive models (GAM), ensemble learning methods (ELM), robust regression, and semi-parametric regression, among others.

GLMs, in particular, model the linear relationship between a predicted response(s), or dependent variable(s), and a set of predictors, or a set of independent variables. In property and casualty insurance ratemaking applications, the predicted variable may be one of the following: claim frequency, claim severity, pure premium, or loss ratio. However, there are technological challenges associated with building and combining GLMs (and other types of models). Accordingly, there is an opportunity for techniques and platforms for effectively and efficiently building and combining various types of models.

BRIEF SUMMARY

The present embodiments may relate to, inter alia, data modeling, including building and combining data models using various platforms and techniques. The embodiments described herein relate particularly to various aspects of enabling users to input assumptions and parameters in association with building data models, and automatically facilitating the building of data models according to those inputs. The embodiments described herein additionally relate to techniques for combining data models and techniques for selecting a "champion" data model.

In one aspect, a computer-implemented method within a computing device of enabling the management of data models may be provided. The method may include: generating, by a computer processor, a model build partition, including enabling a user to input, via a user interface: a storage location where data, inputs and model outputs are stored, a data to be partitioned, a set of variables to be binned, a set of identifications for (1) at least one of a training dataset and a validation dataset, and (2) modeling data, and a set of selections associated with (i) an exploratory data analysis (EDA), (ii) a variable selection, (iii) modeling method(s), (iv) model ensemble process(es) and/or (v) a challenger model comparison. The method may further include generating, by the processor, the modeling output according to the model build partition, and displaying, in the user interface, a set of results associated with generating the modeling output, the set of results including: (a) a set of model level results, and/or (b) a set of variable level results. The method may include additional, less, or alternate actions, including those discussed elsewhere herein.

For instance, enabling the user to input the set of variables to be binned may include enabling the user to input, for each of the set of variables, (i) a binning technique, (ii) a number of bins, and/or (iii) a binned value. Additionally or alternatively, enabling the user to input a data to be partitioned may include enabling the user to input, via the user interface, (i) a stratification selection, (ii) a sample percent, and/or (iii) a random seed.

In some embodiments, enabling the user to input the set of identifications for the modeling data may include enabling the user to input (i) a model type, (ii) a distribution, (iii) a link function, and/or (iv) a unique identifier. Additionally or alternatively, enabling the user to input the set of identifications for the modeling data may include enabling the user to input a set of predictors and a response variable.

In some embodiments, enabling the user to input the set of selections associated with the exploratory data analysis (EDA) may include enabling the user to input whether to run the EDA using the entire dataset or using the training dataset. Additionally or alternatively, enabling the user to input the set of selections associated with the variable selection may include enabling the user to input (i) whether to run the variable selection using the entire dataset or using the training dataset, (ii) a set of model effects, and/or (iii) a set of variable selection techniques.

In some embodiments, enabling the user to input the set of selections associated with the modeling methods may include enabling the user to input (i) whether to generate the modeling output using the entire dataset or using the training dataset, (ii) a model iteration identification, and/or (iii) a set of model effects.

In some embodiments, displaying the set of model level results may include displaying, in the user interface, a set of prediction statistics. Additionally or alternatively, displaying the set of variable level results may include displaying, in the user interface, a set of main effects and a set of interaction relativity plots.

In some embodiments, the modeling output may include multiple model outputs, and the method may further include combining the multiple outputs using either an additive technique or a multiplicative statistical technique. Additionally or alternatively, the method may further include, after combining the multiple models: selecting a champion model.

In another aspect, a computer system for enabling the management of data models may be provided. The system may include: a user interface, a memory storing a set of computer-executable instructions, and a processor with the user interface and memory. The processor may be configured to execute the computer-executable instructions to cause the processor to: generate a model build partition, including enabling a user to input, via the user interface: a storage location where data, inputs and model outputs are stored, a data to be partitioned, a set of variables to be binned, a set of identifications for (1) at least one of a training dataset and a validation dataset, and (2) modeling data, and a set of selections associated with (i) an exploratory data analysis (EDA), (ii) a variable selection, (iii) modeling method(s), (iv) model ensemble process(es) and/or (v) a challenger model comparison. The processor may be further configured to generate the modeling output according to the model build partition, and cause the user interface to display a set of results associated with generating the modeling output, the set of results including: (a) a set model level results, and/or (b) a set of variable level results. The computer system may include additional, less, or alternate functionality, including that discussed elsewhere herein.

For instance, the set of variables to be binned may include, for each of the set of variables, (i) a binning technique, (ii) a number of bins, and/or (iii) a binned value. Additionally or alternatively, the set of identifications for the modeling data may include a set of predictors and a response variable.

In some embodiments, the set of selections associated with the exploratory data analysis (EDA) may include whether to run the EDA using the entire dataset or using the training dataset. Additionally or alternatively, the set of selections associated with the variable selection may include (i) whether to run the variable selection using the entire dataset or using the training dataset, (ii) a set of model effects, and/or (iii) a set of variable selection techniques. The set of selections associated with the modeling methods may also include (i) whether to generate the modeling output using the entire dataset or using the training dataset, (ii) a model iteration identification, and/or (iii) a set of model effects.

In some embodiments, the set of model level results may include a set of prediction statistics. Additionally or alternatively, the set of variable level results may include a set of main effects and a set of interaction relativity plots.

In some embodiments, the modeling output may include a first model output and a second model output, and the processor may be further configured to combine the first model output and the second model output using either an additive technique or a multiplicative technique. Additionally or alternatively, the processor may be further configured to, after combining the first model output and the second model output, select a champion model.

In another aspect, a computer-implemented method in a computing device of enabling the management of data models may be provided. The method may include (1) generating, by a computer processor, a model build partition, including enabling a user to input, via a user interface: a storage location where a modeling output is to be stored; a set of variables to be binned; a set of identifications and/or user selections for modeling data, and/or a Generalized Linear Model (GLM) to be created and/or programmed by the computer processor; and/or a set of selections associated with (i) an exploratory data analysis (EDA), (ii) a variable selection, and/or (iii) a challenger model comparison; (2) generating, by the computer processor, the modeling output according to the model build partition; and/or (3) displaying, in the user interface, a set of results associated with generating the modeling output, the set of results including: (a) a set of model level results, and/or (b) a set of variable level results. The method may include additional, less, or alternate actions, including those discussed elsewhere herein.

In another aspect, a computer system for enabling the management of data models may be provided. The system may include: a user interface; a memory storing a set of computer-executable instructions; and/or a processor interfaced with the user interface and the memory, and configured to execute the computer-executable instructions to cause the processor to: (1) generate a model build partition, including enabling a user to input, via the user interface: a storage location where a modeling output is to be stored; a set of variables to be binned; a set of identifications and/or user selections for modeling data, and/or a Generalized Linear Model (GLM) to be created and/or programmed by the computer processor, and/or a set of selections associated with (i) an exploratory data analysis (EDA), (ii) a variable selection, and/or (iii) a challenger model comparison; (2) generate the modeling output according to the model build partition, and/or (3) cause the user interface to display a set of results associated with generating the modeling output, the set of results including: (a) a set model level results, and/or (b) a set of variable level results. The computer system may include additional, less, or alternate functionality, including that discussed elsewhere herein.

In another aspect, a computer-implemented method in a computing device of enabling the management of data models may be provided. The method may include (1) generating, by a computer processor, a model build partition, including enabling a user to input, via a user interface: a storage location where a modeling output is to be stored; a set of variables to be binned; a set of identifications and/or user selections for modeling data, and/or a Generalized Additive Model (GAM) to be created and/or programmed by the computer processor; and/or a set of selections associated with (i) an exploratory data analysis (EDA), (ii) a variable selection, and/or (iii) a challenger model comparison; (2) generating, by the computer processor, the modeling output according to the model build partition; and/or (3) displaying, in the user interface, a set of results associated with generating the modeling output, the set of results including: (a) a set of model level results, and/or (b) a set of variable level results. The method may include additional, less, or alternate actions, including those discussed elsewhere herein.

In another aspect, a computer system for enabling the management of data models may be provided. The method may include: a user interface; a memory storing a set of computer-executable instructions; and a processor interfaced with the user interface and the memory, and configured to execute the computer-executable instructions to cause the processor to: (1) generate a model build partition, including enabling a user to input, via the user interface: a storage location where a modeling output is to be stored; a set of variables to be binned; a set of identifications and/or user selections for modeling data, and/or a Generalized Additive Model (GAM) to be created and/or programmed by the computer processor; and/or a set of selections associated with (i) an exploratory data analysis (EDA), (ii) a variable selection, and/or (iii) a challenger model comparison; (2) generate the modeling output according to the model build partition, and/or (3) cause the user interface to display a set of results associated with generating the modeling output, the set of results including: (a) a set model level results, and/or (b) a set of variable level results. The computer system may include additional, less, or alternate functionality, including that discussed elsewhere herein.

In another aspect, a computer-implemented method in a computing device of enabling the management of data models may be provided. The method may include (1) generating, by a computer processor, a model build partition, including enabling a user to input, via a user interface: a storage location where a modeling output is to be stored; a set of variables to be binned; a set of identifications and/or user selections for modeling data, and/or an Ensemble Learning Method (ELM) to be created and/or programmed by the computer processor; and/or a set of selections associated with (i) an exploratory data analysis (EDA), (ii) a variable selection, and/or (iii) a challenger model comparison; (2) generating, by the computer processor, the modeling output according to the model build partition; and/or (3) displaying, in the user interface, a set of results associated with generating the modeling output, the set of results including: (a) a set of model level results, and/or (b) a set of variable level results. The method may include additional, less, or alternate actions, including those discussed elsewhere herein.

In another aspect, a computer system for enabling the management of data models may be provided. The computer system may include: a user interface; a memory storing a set of computer-executable instructions; and/or a processor interfaced with the user interface and the memory, and configured to execute the computer-executable instructions to cause the processor to: (1) generate a model build partition, including enabling a user to input, via the user interface: a storage location where a modeling output is to be stored; a set of variables to be binned; a set of identifications and/or user selections for modeling data, and/or an Ensemble Learning Method (ELM) to be created and/or programmed by the computer processor; and/or a set of selections associated with (i) an exploratory data analysis (EDA), (ii) a variable selection, and/or (iii) a challenger model comparison; (2) generate the modeling output according to the model build partition, and/or (3) cause the user interface to display a set of results associated with generating the modeling output, the set of results including: (a) a set model level results, and/or (b) a set of variable level results. The computer system may include additional, less, or alternate functionality, including that discussed elsewhere herein.

In another aspect, a computer-implemented method of building a Generalized Linear Model (GLM), Generalized Additive Model (GAM), or Ensemble Learning Method (ELM) model and then model ratemaking information may be provided. The method may include, via one or more processors: (1) accepting user input that identifies a file from which to retrieve ratemaking input data; (2) accepting user input that identifies a file to which store results generated from a user-defined GLM, GAM, or ELM, respectively, created using user-selections acting upon the ratemaking input data; (3) accepting user-selected variables related to the user-defined GLM, GAM, or ELM, respectively, to be created; (4) translating the user-selected variables into a programming language code that can be compiled, executed, and/or run by one or more processors to create the user-defined GLM, GAM, or ELM, respectively, that is defined by the user-selected variables; (5) executing the programming language code to create the user-defined GLM, GAM, or ELM, respectively; (6) feeding the ratemaking input data into the user-defined GLM, GAM, or ELM, respectively, created to model the ratemaking input data and generate modeling results; and/or (7) displaying the modeling results to facilitate modeling ratemaking information. The method may include additional, less, or alternate actions, including those discussed elsewhere herein.

In another aspect, a computer system configured to build a Generalized Linear Model (GLM), Generalized Additive Model (GAM), or Ensemble Learning Method (ELM) model and then model ratemaking information may be provided. The computer system may include one or more processors, and/or a graphical user interface, configured to: (1) accept user input that identifies a file from which to retrieve ratemaking input data; (2) accept user input that identifies a file to which store results generated from a user-defined GLM, GAM, or ELM, respectively, created using user-selections acting upon the ratemaking input data; (3) accept user-selected variables related to the user-defined GLM, GAM, or ELM, respectively, to be created; (4) translate the user-selected variables into a programming language code that can be compiled, executed, and/or run by the one or more processors to create the user-defined GLM, GAM, or ELM, respectively, that is defined by the user-selected variables; (5) execute the programming language code to create the user-defined GLM, GAM, or ELM, respectively; (6) feed the ratemaking input data into the user-defined GLM, GAM, or ELM, respectively, created to model the ratemaking input data and generate modeling results; and/or (7) display the modeling results to facilitate modeling ratemaking information. The computer system may include additional, less, or alternate functionality, including that discussed elsewhere herein.

Systems or computer-readable media storing instructions for implementing all or part of the methods described above may also be provided in some aspects. Systems for implementing such methods may include one or more of the following: a special-purpose assessment computing device, a mobile computing device, a remote server, one or more sensors, one or more communication modules configured to communicate wirelessly via radio links, radio frequency links, and/or wireless communication channels, and/or one or more program memories coupled to one or more processors of the mobile computing device, or remote server. Such program memories may store instructions to cause the one or more processors to implement part or all of the method described above. Additional or alternative features described herein below may be included in some aspects.

Advantages will become more apparent to those of ordinary skill in the art from the following description of the preferred aspects which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

The figures described below depict various aspects of the present disclosure. It should be understood that each figure depicts an embodiment of a particular aspect of the present disclosure. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein:

FIG. 2 illustrates an exemplary interface associated with a structure component associated with model building in accordance with one aspect of the present disclosure;

FIG. 3 illustrates an exemplary interface associated with a binning sub-component associated with model building in accordance with one aspect of the present disclosure;

FIG. 4 illustrates an exemplary interface associated with a sampling sub-component associated with model building in accordance with one aspect of the present disclosure;

FIG. 5 illustrates an exemplary interface associated with a data sub-component associated with model building in accordance with one aspect of the present disclosure;

FIG. 6 illustrates an exemplary interface associated with an EDA sub-component associated with model building in accordance with one aspect of the present disclosure;

FIG. 7 illustrates an exemplary interface associated with a variable selection sub-component associated with model building in accordance with one aspect of the present disclosure;

FIG. 8 illustrates an exemplary interface associated with a challenger model sub-component associated with model building in accordance with one aspect of the present disclosure;

FIG. 13B illustrates an exemplary interface associated with an additive data model combination technique in accordance with one aspect of the present disclosure;

FIG. 13C illustrates an exemplary interface associated with selecting a champion data model in accordance with one aspect of the present disclosure;

The Figures depict aspects of the present invention for purposes of illustration only. One skilled in the art will readily recognize from the following discussion that alternate aspects of the structures and methods illustrated herein may be employed without departing from the principles of the invention described herein.

DETAILED DESCRIPTION

In general, data modeling is used in various contexts to assess risk in insurance, finance, and other industries and professions. For example, in life insurance assessments, data models may incorporate the analysis of mortality data, the production of life tables, and the application of compound interest. As another example, health insurance modeling may focus on the analysis of rates of disability, morbidity, mortality, fertility, and other factors.

The systems and methods of the present disclosure offer a variety of data science and statistical data modeling methods. Generally, a data model may assess the linear or non-linear relationship between a response variable (i.e., a dependent variable), and a set of predictors (i.e., input or independent variables). For example, in property and casualty insurance ratemaking applications, the response variable may be one of: claim frequency, claim severity, pure premium, or loss ratio. Additionally, examples of ratemaking predictors may be: type of vehicle, age, or marital status for auto insurance; and construction type, building age, or amount of insurance (AOI) for homeowners insurance.

According to some embodiments, techniques and platforms for building, managing, and combining data models are discussed. The techniques and platforms may build data models using a model build partition and a model assessment partition. The model build partition may incorporate a set of data transformation and modeler techniques, and the model assessment partition may incorporate a model level comparison and a variable level comparison.

According to some embodiments, the systems and methods may be supported by a server computer, and data may be uploaded to and stored on the server. Additionally, the server may support client login, for example using a username and password, or other techniques.

The systems and methods offer numerous benefits. In particular, the systems and methods effectively and efficiently enable users to input data modeling parameters, and automatically populate applications with the requisite programming code that reflects the inputted parameters. The systems and methods further employ data model combining and selecting techniques that effectively and efficiently identify accurate and useful data models for subsequent use. It should be appreciated that additional benefits are envisioned and realized.

Exemplary Model Building Techniques

Figure 1:
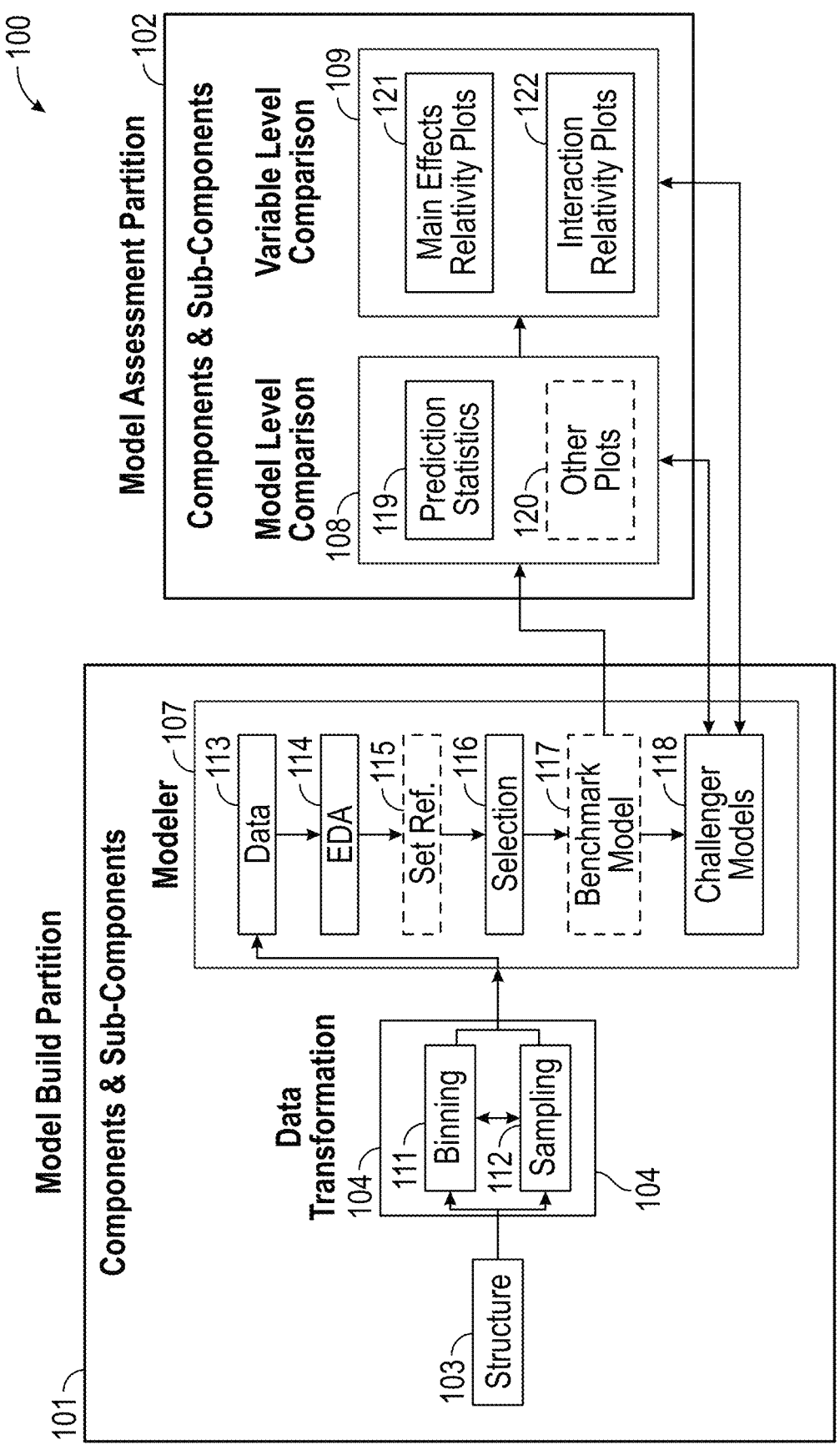
FIG. 1 is an illustration of an exemplary technique for building a single data model in accordance with one aspect of the present disclosure.

FIG. 1 is an illustration of a technique 100 for building a single data model, according to certain aspects. As illustrated in FIG. 1, the technique 100 may include a model build partition 101 and a model assessment partition 102. The model build partition 101 may include the following components and subcomponents: a structure component 103, a data transformation component 104 (with the following sub-components: binning 111 and sampling 112), and a modeler component 107 (with the following sub-components: data 113, exploratory data analysis (EDA) 114, set ref 115, variable selection 116, benchmark model 117, and challenger model comparison 118).

In one embodiment, setting a reference level 115 after EDA 114 in single tool may be a new and innovative approach. Also believed to be unique is building a benchmark model 117 and computing prediction statistics 119 before building challenger models 118 within a single tool.

The model assessment partition 102 may include the following components and subcomponents: a model level comparison 108 (with the following sub-components: prediction statistics 119 and other plots 120), and a variable level comparison 109 (with the following sub-components: main effects relativity plots 121 and interaction relativity plots 122).

Exemplary Structure Component Interface

Figure 2:
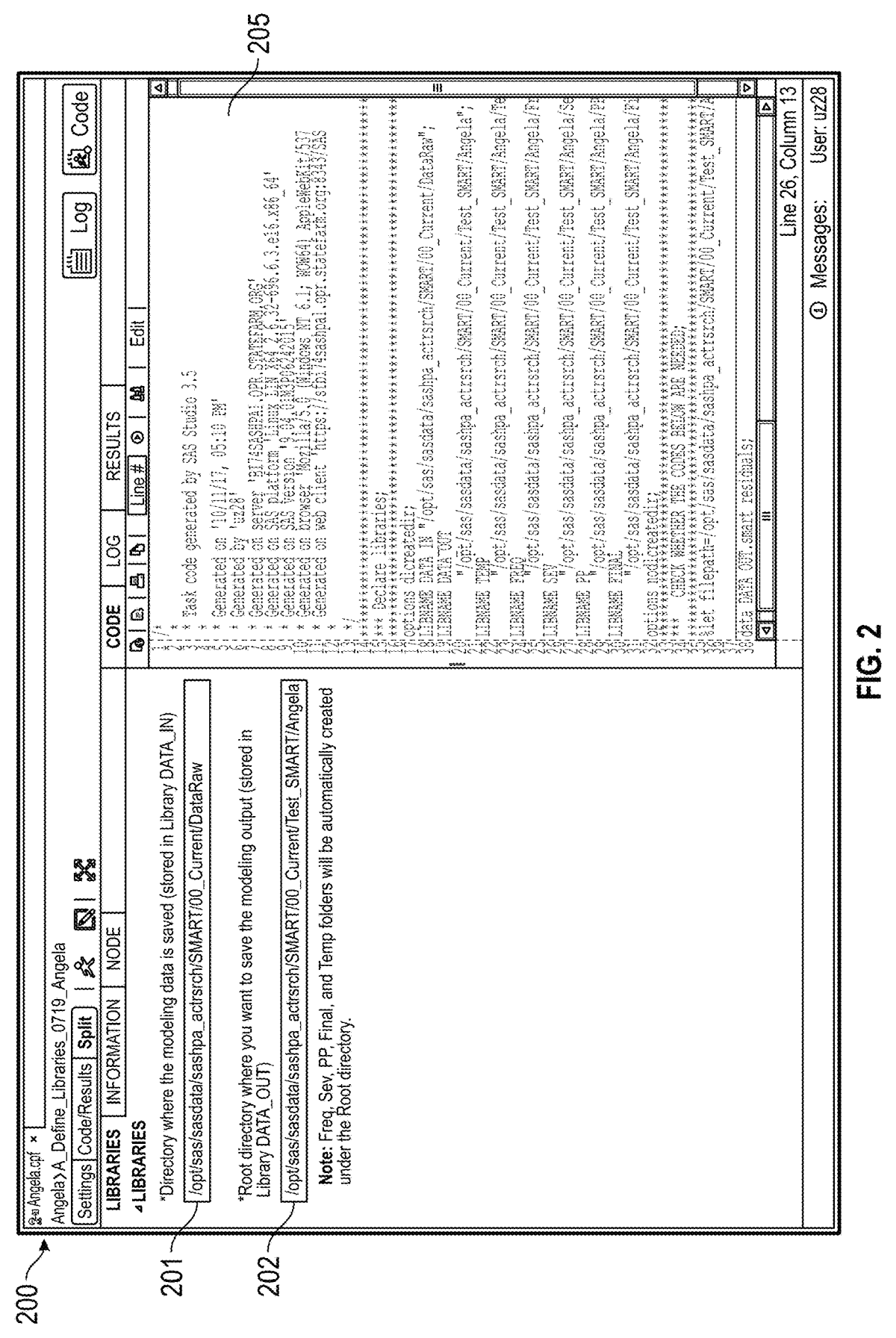

The structure component 103 may aim to automatically create a modeling folder structure using programming language. According to some embodiments, a user such as an analyst may identify a location of the data. FIG. 2 illustrates an exemplary interface 200 associated with the structure component 103. The interface 200 may include an input window 201 into which an individual may input a directory where modeling data is to be saved. Additionally, the interface 200 may include a root directory input window 202 into which an individual may input a root directory where the modeling output is to be saved.

The interface 200 may further include a coding window 205 that may be displayed alongside the other windows 201, 202, or in a different location. In association with the individual inputting information into one or more of the windows 201, 202, the coding window 205 may automatically populate with program code that corresponds to the inputted information. For example, the coding window 205 automatically updates lines of program code for the inputted modeling data directory ("DataRaw"). In this regard, the platform enables automatic program code generation corresponding to the inputted information.

The binning sub-component 111, as discussed with respect to FIG. 1, may aim to combine categories of insufficient data so that the model prediction may be stable/credible. According to some embodiments, the systems and methods may support the following functionalities: displaying a list of variables in a dataset to enable analysts or other individuals to correctly identify variables, transforming options for binned values within the platform, and enabling name assignment for newly-created binned variables (or enabling the platform to assign default names).

Exemplary Data Transformation Component

In general, the present embodiments may include a data transformation component. The objectives and functionality of the data transformation component may include preparing the data for modeling—which may include binning and random sampling.

The objective and functionality of binning may be to combine categories of insufficient data. The new processes within the tool (later referred to as the SMART Tool herein) may include displaying a list of variables in the data set to help analysts correctly identify variables; transforming options for binned values within the tool; and/or allowing name assignment for the newly created binned variable or allowing the SMART Tool to assign default names.

The objective and functionality of random sampling may be to divide the data into training and validation data. This division facilitates creating of build and validate datasets. The integration and organization of the data transformations within a single tool is believed to be a new approach to modeling processes.

Exemplary Binning Component Interface

Figure 3:
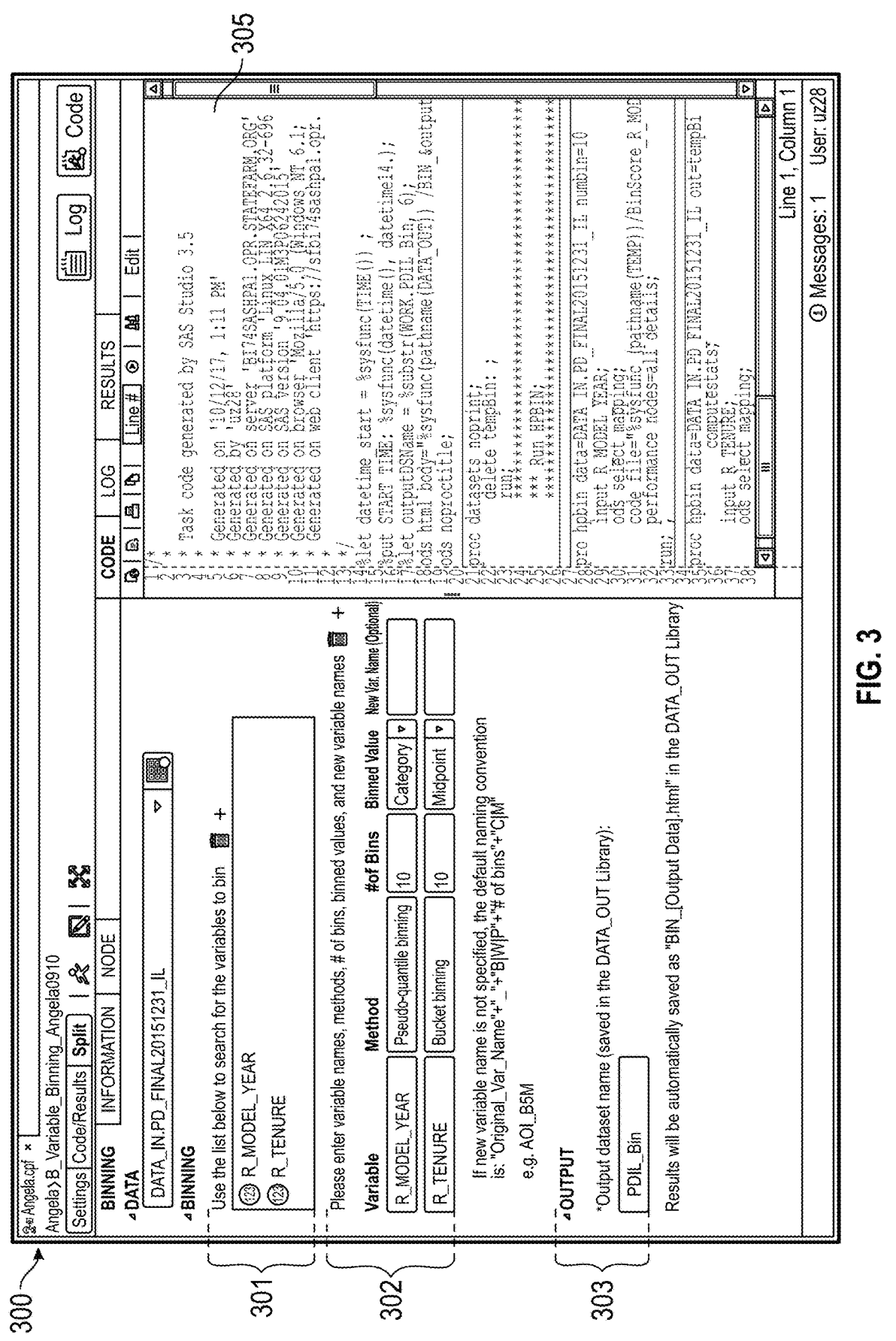

FIG. 3 illustrates an example interface 300 associated with the binning sub-component 111 of the data transformation component. The interface 300 may include an input window 301 into which an individual may add variables to be binned. Additionally, the interface 300 may include a binning input window 302 into which an individual may specify the following information: the variable, the binning method (e.g., pseudo-quantile binning or bucket binning), a number of bins (e.g., ten (10)), a new variable name, and/or other information). The interface 300 may further include an output window 303 into which an individual may input a desired name for the output dataset.

The interface 300 may further include a coding window 305 that may be displayed alongside the other windows 301, 302, 303, or in a different location. In association with the individual inputting information into one or more of the windows 301, 302, 303, the coding window 305 may automatically populate with program code that corresponds to the inputted information. For example, the coding window 305 automatically adds lines of program code for the inputted variables "R_MODEL_YEAR" and "R_TENURE". For further example, the coding window 305 automatically updates a line of program code to name the output data set as "PDIL_Bin". In this regard, the platform enables automatic program code generation corresponding to inputted information associated with variable binning.

Exemplary Sampling Component Interface

Figure 4:
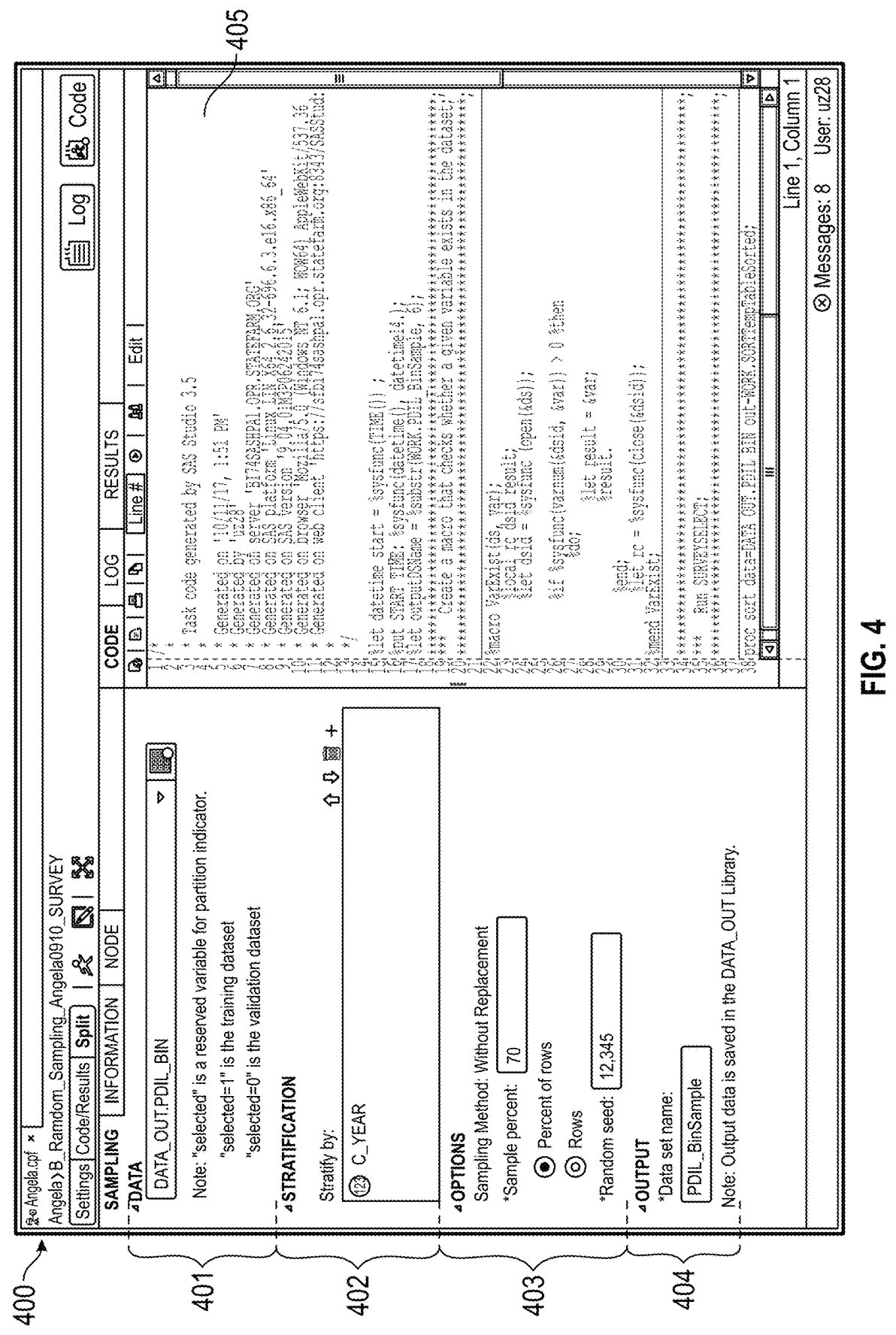

FIG. 4 illustrates an example interface 400 associated with the sampling sub-component 112 of the data transformation component. The interface 400 may include an input window 401 into which an individual may specify a dataset to be sampled (as shown: "DATA_OUT.PDIL_BIN"). Additionally, the interface 400 may include a stratification window 402 into which an individual may input a parameter(s) by which to stratify. The interface 400 may further include an options window 403 into which an individual may specify the following parameters: a sample percent (or a number of rows), a random seed number, and/or other information. The interface 400 may further include an output window 404 into which an individual may input a desired name for the output dataset.

The interface 400 may further include a coding window 405 that may be displayed alongside the other windows 401-404, or in a different location. In association with the individual inputting information into one or more of the windows 401-404, the coding window 405 may automatically populate with program code that corresponds to the inputted information. For example, the coding window 405 automatically updates lines of program code for the inputted dataset to be sampled ("DATA_OUT.PDIL_BIN"). In this regard, the platform enables automatic program code generation corresponding to inputted information associated with data sampling.

According to some embodiments, the data sub-component 113 of the modeler component 107 facilitates or performs various functionalities. In particular, the data sub-component 113 enables for the identification of modeling data, dynamically selects the target variable and distribution parameters, selects unique identifiers, and identifies the types of explanatory variables, among other features.

Exemplary Data Component Interface

As shown in FIG. 1, the modeler component 107 may include a data sub-component 113. The objectives and functionality of the data sub-component 113 may include allowing for the identification of modeling data; dynamic selection of the target variable and distribution; selecting unique identifiers; and/or identifying the types of explanatory variables. The dynamic selection of target variables and the associated distributions within a single tool is believed to represent a new approach to modeling processes.

Figure 5:
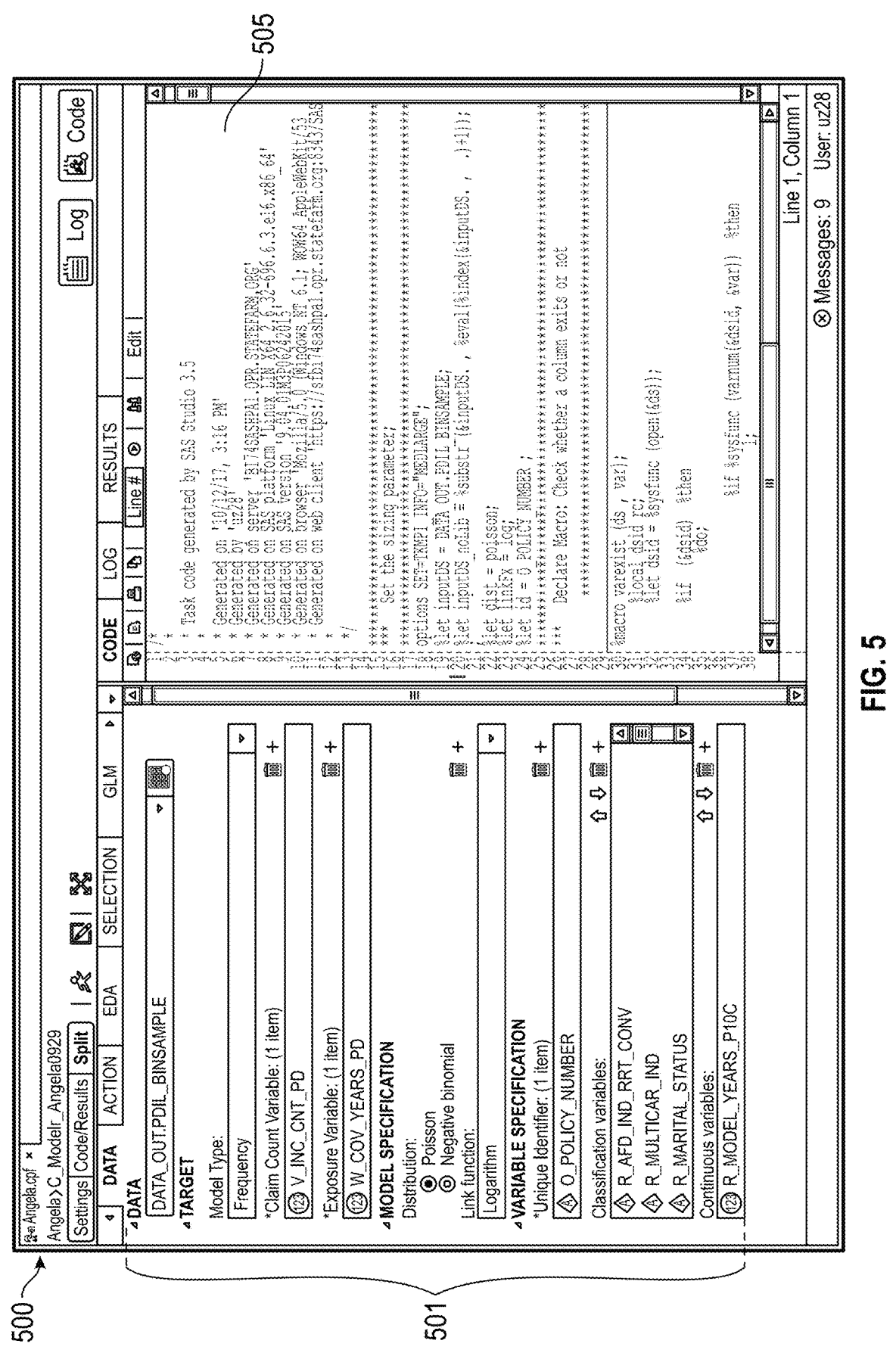

FIG. 5 illustrates an exemplary interface 500 associated with the data sub-component 113 of the modeler component 107. The interface 500 may include an input window 501 into which an individual may specify various information and parameters, including: a dataset, a model type, a target risk variable(s), a target exposure variable, a distribution type (e.g., Poisson, negative binomial), a link function, a unique identifier, a set of classification variables, and a set of continuous variables.

The interface 500 may further include a coding window 505 that may be displayed alongside the window 501, or in a different location. In association with the individual inputting information into the window 501, the coding window 505 may automatically populate with program code that corresponds to the inputted information. For example, the coding window 505 automatically updates a line of program code to reflect the selected Poisson distribution. In this regard, the platform enables automatic program code generation corresponding to inputted information associated with the data sub-component.

According to some embodiments, the exploratory data analysis (EDA) sub-component 114 of the modeler component 107 facilitates or performs various functionalities. In particular, the EDA sub-component 114 calculates statistics of the observed actual target variable, automatically stores and manages the univariate analysis results to the corresponding modeling folder, facilitates data error identification, and provides a general overview of the data before a multivariate analysis, among other features.

Exemplary EDA Component Interface

As shown in FIG. 1, the modeler component 107 may include an exploratory data analysis sub-component 114. The objectives and functionality of the EDA sub-component 114 may include calculating statistics of the observed actual target variable; automatically storing and managing the univariate analysis results to the corresponding modeling folder; facilitating data error identification; and/or providing a general overview of the data before multivariate analysis. The automatic storage and management of univariate analysis within a single tool is believed to represent a new approach to modeling processes.

FIG. 6 illustrates an exemplary interface 600 associated with the EDA sub-component 114 of the modeler component 107. The interface 600 may include an input window 601 into which an individual may specify various information and parameters, including a dataset analysis selection. The input window 601 may further including information associated with the EDA sub-component, including univariate analysis, interaction detection, and output. The interface 600 may further include a data display window 605 that may be displayed alongside the window 601, or in a different location. According to some embodiments, the data display window 605 may display various data associated with the EDA sub-component 114.

According to some embodiments, the variable selection sub-component 116 of the modeler component 107 facilitates or performs various functionalities. In particular, the variable selection sub-component 116 may facilitate the incorporation of multiple variable selection techniques into a single process, output selection results in a summarized table format, and automatically store and manage the variable selection results within a tools data structure, among other features.

Exemplary Variable Selection Component Interface

As shown in FIG. 1, the modeler component 107 may include a variable selection sub-component 116. The objectives and functionality of the variable selection sub-component 116 may include facilitating the incorporation of run multiple variable selection techniques into a single process; outputting the selection results in a summarized table format; and/or automatically storing and managing the variable selection results within the tools data structure. The automatic storage and management of variable selection analysis within a single tool is believed to represent a new approach to modeling processes.

Figure 7:
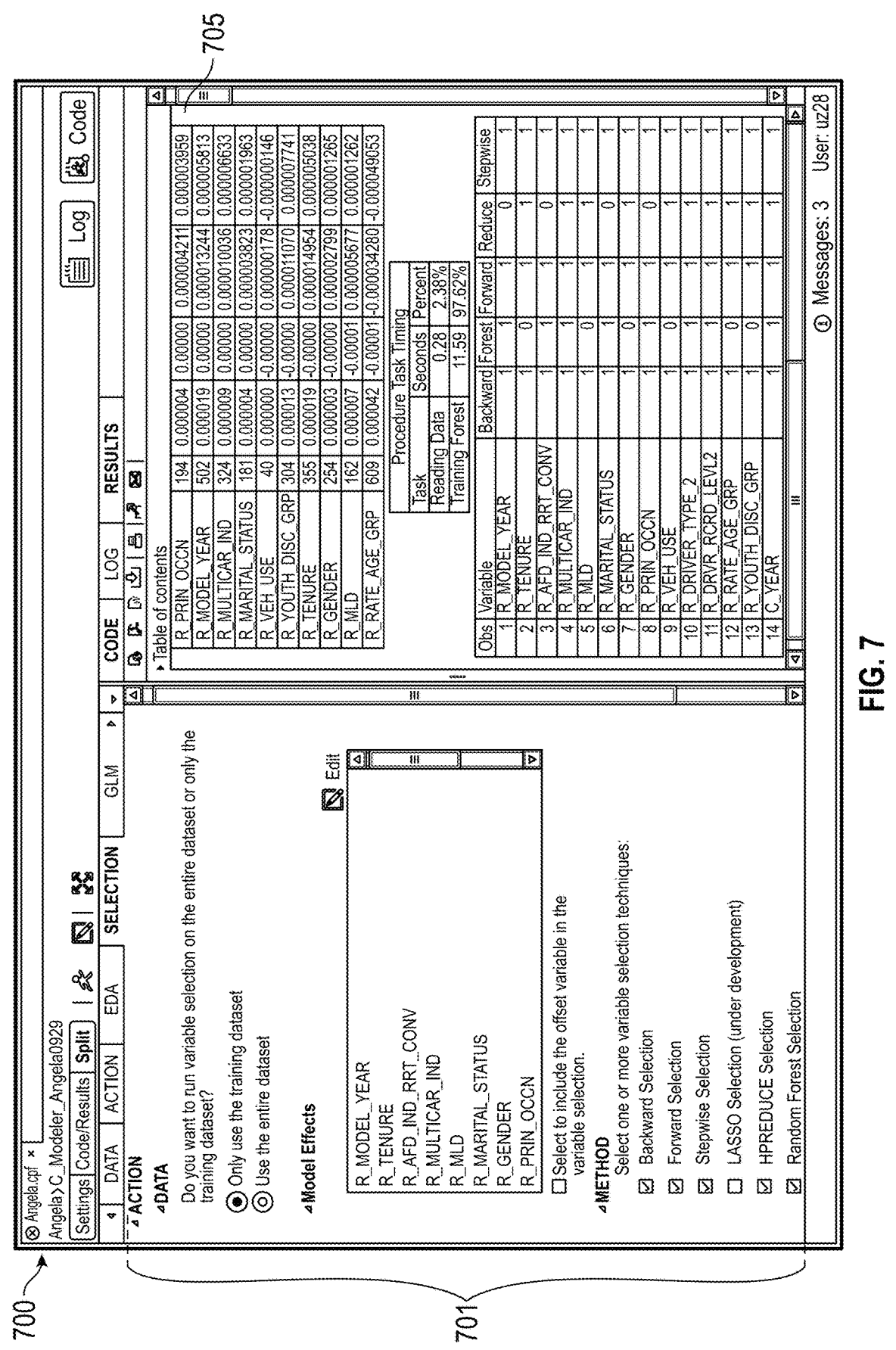

FIG. 7 illustrates an exemplary interface 700 associated with the variable selection sub-component 116 of the modeler component 107. The interface 700 may include an input window 701 into which an individual may specify various information and parameters, including: a dataset selection, a set of model effects, and a set of methods. The interface 700 may further include a data display window 705 that may be displayed alongside the window 701, or in a different location. According to some embodiments, the data display window 705 may display various data associated with the variable selection sub-component 116, including a summary table of the analysis.

According to some embodiments, the challenger model sub-component 118 of the modeler component 107 facilitates or performs various functionalities. In particular, the challenger model sub-component 118 may facilitate the creation of generalized linear models, other statistical and data science models, output and organize parameter estimates in an easily-interpretable manner, compute prediction statistics and summarize general information about the model, automatically store and manage modeling results within the tools structure and create the appropriate output files, among other features.

Exemplary Challenger Model Component Interface

As shown in FIG. 1, the modeler component 107 may include a challenger model sub-component 118. The objectives and functionality of the challenger model sub-component 118 may include facilitating the creation of generalized linear models; other statistical and data science models; outputting and organizing parameter estimates in an easily interpretable manner; computing prediction statistics and summarizing general information about the model; and/or automatically storing and managing modeling results within the tools structure and creating the appropriate output files. The automatic storage and management of model results, parameters, and output within a single tool is believed to represent a new approach to modeling processes.

Figure 8:
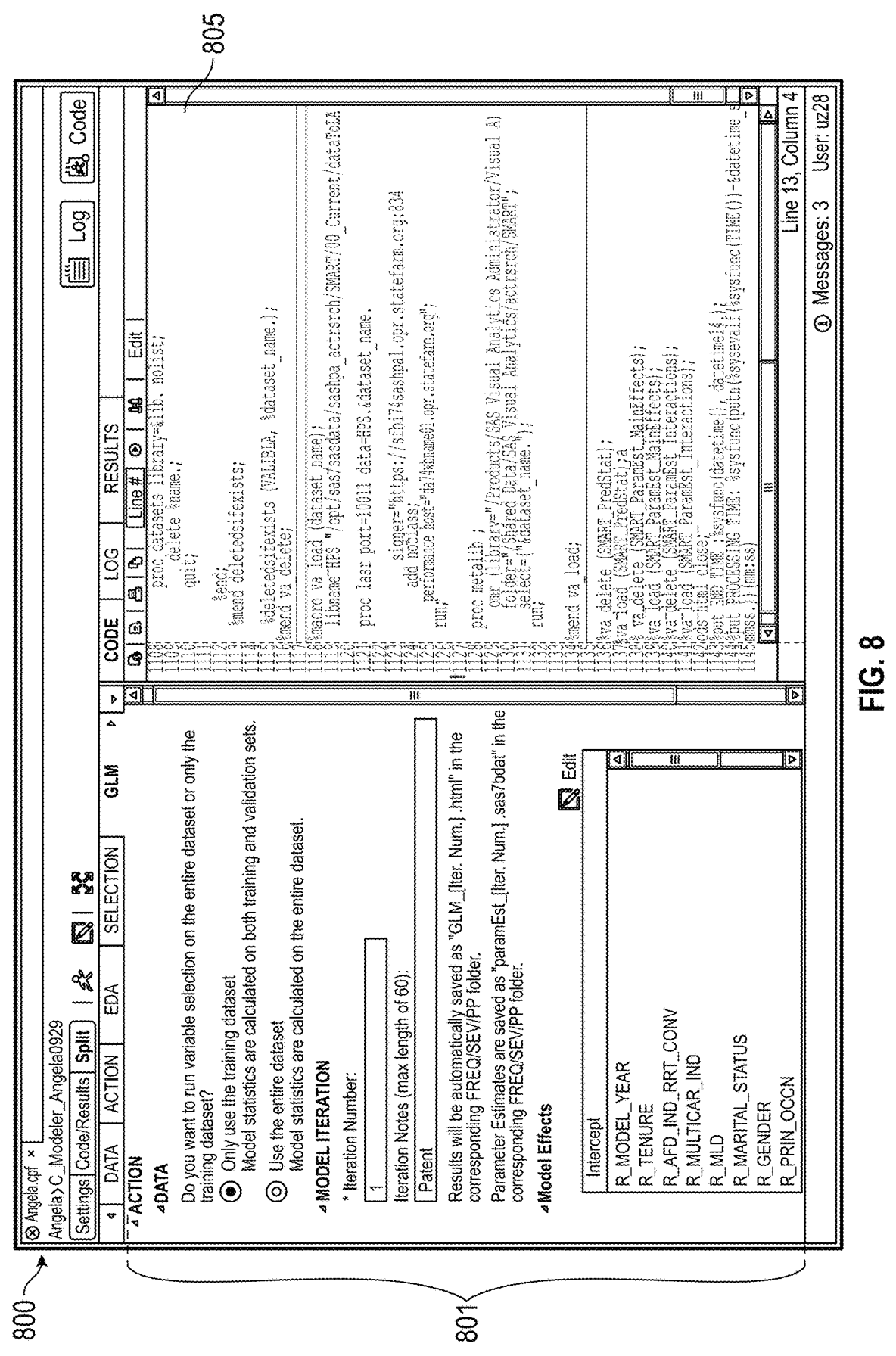

FIG. 8 illustrates an exemplary interface 800 associated with the challenger model sub-component 118 of the modeler component 107. The interface 800 may include an input window 801 into which an individual may specify various information and parameters, including: a data selection, model iteration information, and a set of model effects.

The interface 800 may further include a coding window 805 that may be displayed alongside the window 801, or in a different location. In association with the individual inputting information into the window 801, the coding window 805 may automatically populate with program code that corresponds to the inputted information. In this regard, the platform enables automatic program code generation corresponding to inputted information associated with the challenger model sub-component 118.

Exemplary Model & Variable Level Comparison

Figure 10:
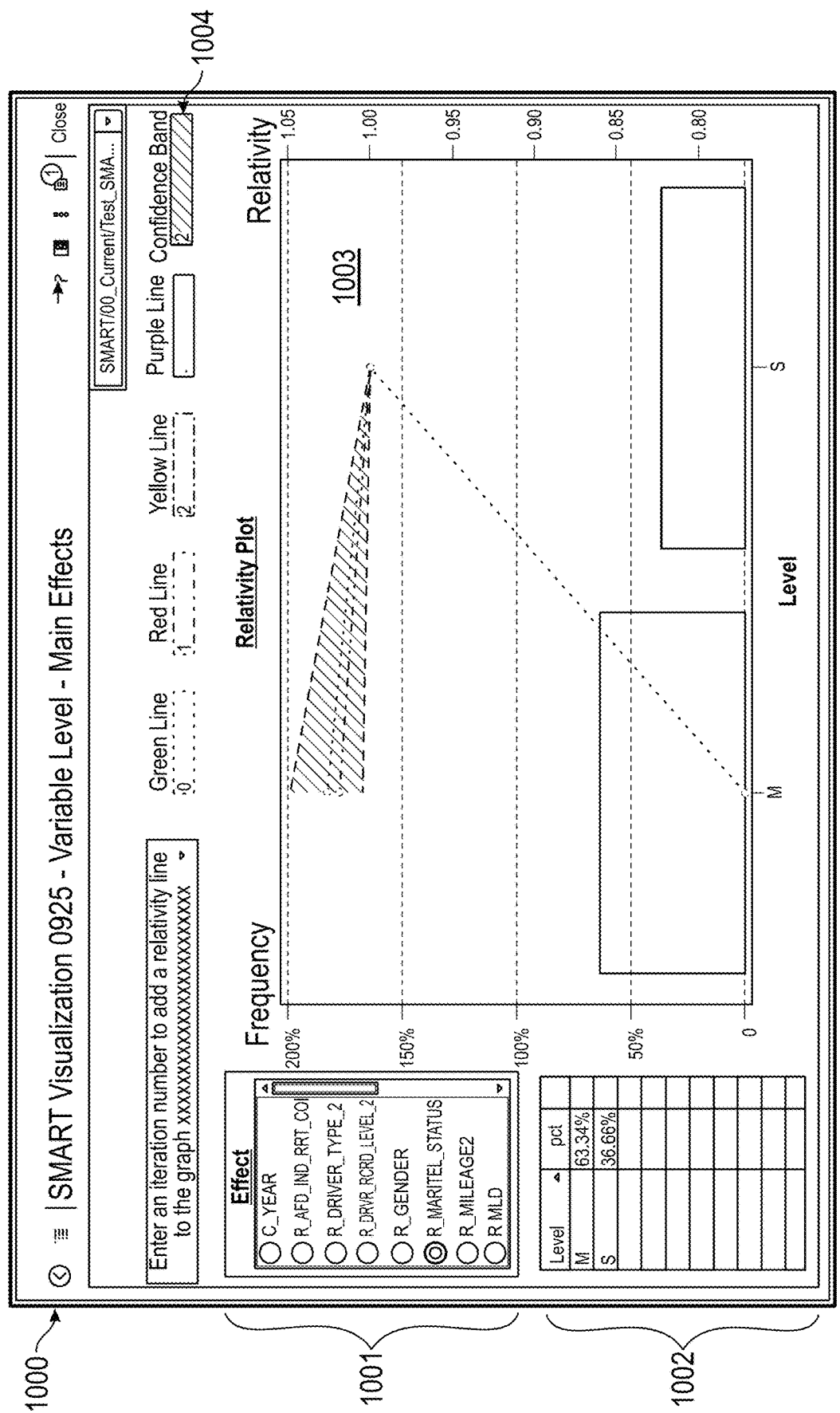
FIG. 10 illustrates an exemplary interface associated with a main effects sub-component associated with model building in accordance with one aspect of the present disclosure.
Figure 11:
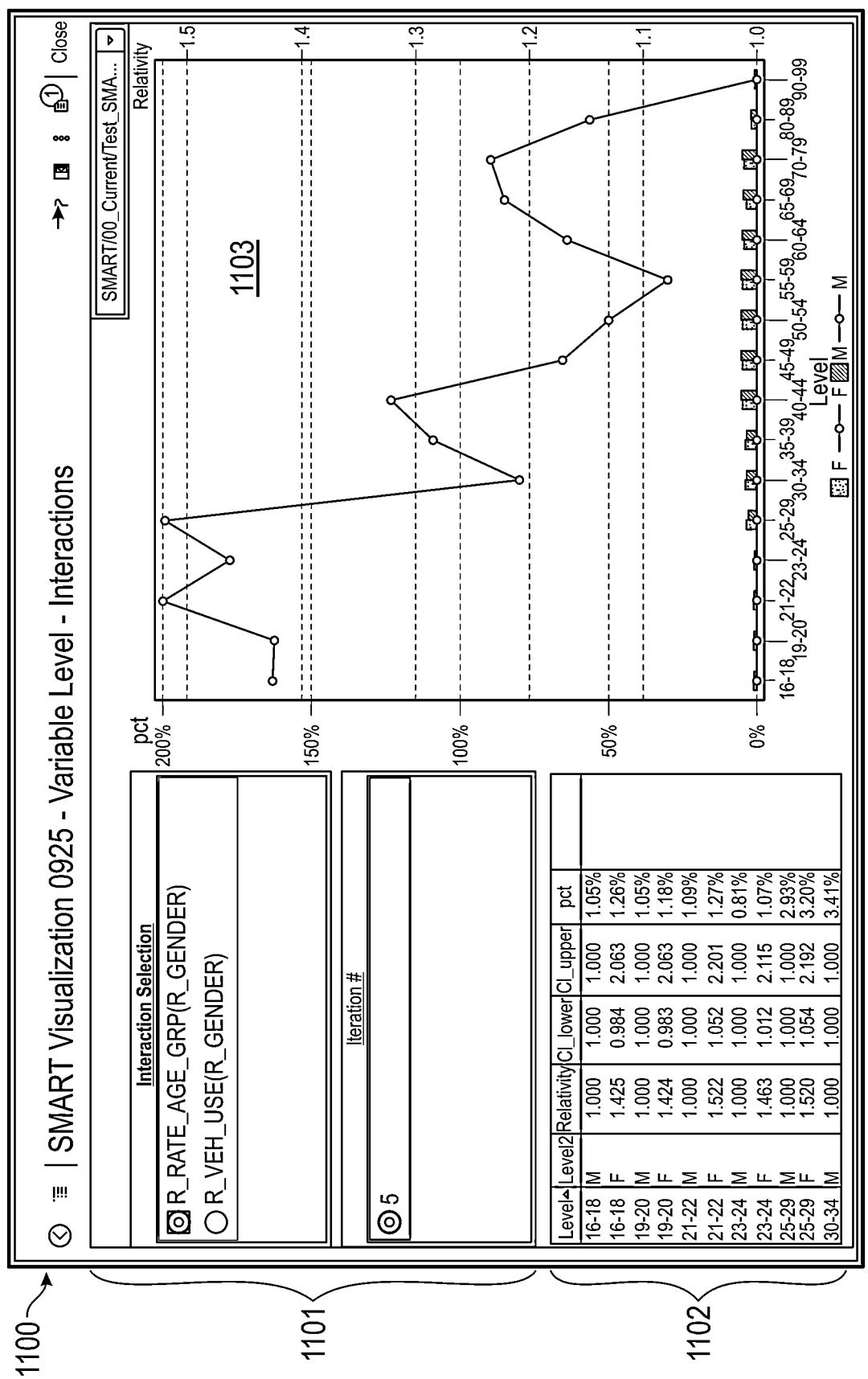
FIG. 11 illustrates an exemplary interface associated with an interaction relativity plots sub-component associated with model building in accordance with one aspect of the present disclosure.

As shown in FIG. 1, the present embodiments may include a model level comparison component 108 and a variable level comparison component 109. These components may provide a number of prediction statistics which compare the prediction accuracy between model iterations. Discussed further below, FIGS. 9 to 11 illustrate prediction statistics associated with the model level comparison, and the main and interaction effects of the variable level comparison, respectively.

Exemplary Prediction Statistics Component Interface

Figure 9:
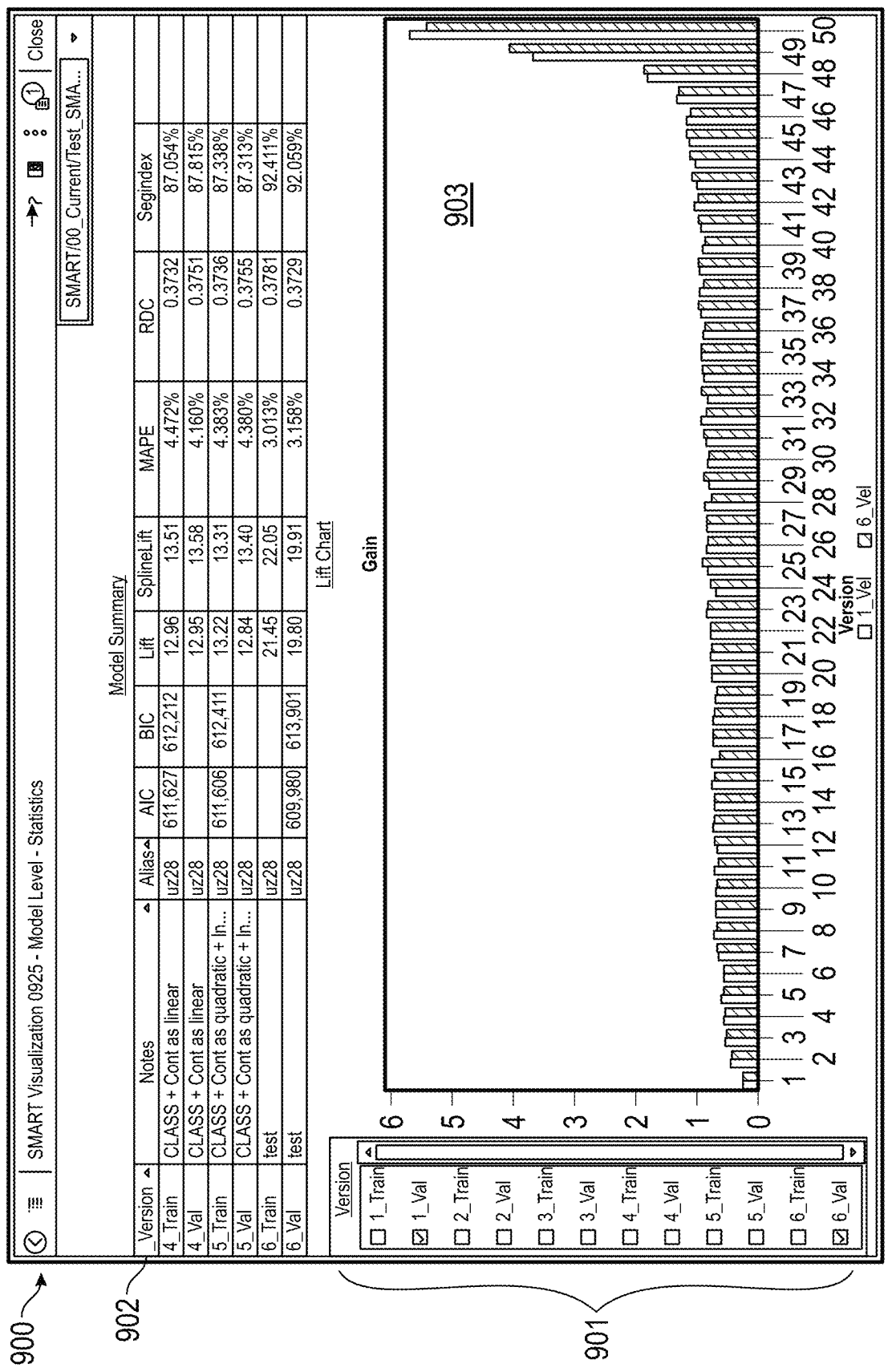
FIG. 9 illustrates an exemplary interface associated with a prediction statistics sub-component associated with model building in accordance with one aspect of the present disclosure.

FIG. 9 illustrates an exemplary interface 900 associated with the prediction statistics sub-component 119 of the model-level comparison 108. The interface 900 may include a model iteration selection window 901, a model summary 902, and a chart 903. The model iteration selection window 901 enables an individual to select one or more model iterations for mapping or charting. The model summary 902 indicates various versions as well as data associated therewith (e.g., AIC, BIC, Lift, etc.). The chart 903 displays relevant data for the selected model iterations (as shown: 1_Val and 6_Val).

Exemplary Main Effects Component Interface

FIG. 10 illustrates an exemplary interface 1000 associated with the main effects sub-component 121 of the variable-level comparison 109. The interface 1000 may include an effect selection window 1001, a level table 1002, and a relativity plot 1003. The effect selection window 1001 may enable an individual to select one or more model effects (as shown: marital status). The level table 1002 may display data associated with the selected effect (as shown: a percentage breakdown of married versus single people). The relativity plot 1003 may display a relativity plot associated with the selected effect. The relativity line display 1004 allows specification of multiple model iterations to be displayed along with confidence intervals.

Exemplary Relativity Plots Component Interface

FIG. 11 illustrates an exemplary interface 1100 associated with the interaction relativity plots sub-component 112 of the variable-level comparison 109. The interface 1100 may include a selection window 1101, a level table 1102, and a relativity plot 1103. The selection window 1101 may enable an individual to select an interaction and an iteration. The level table 1102 may indicate various data associated with certain levels. The relativity plot 1103 may display a relativity plot associated with the selections.

Exemplary Multiplicative Technique

Figure 12A:
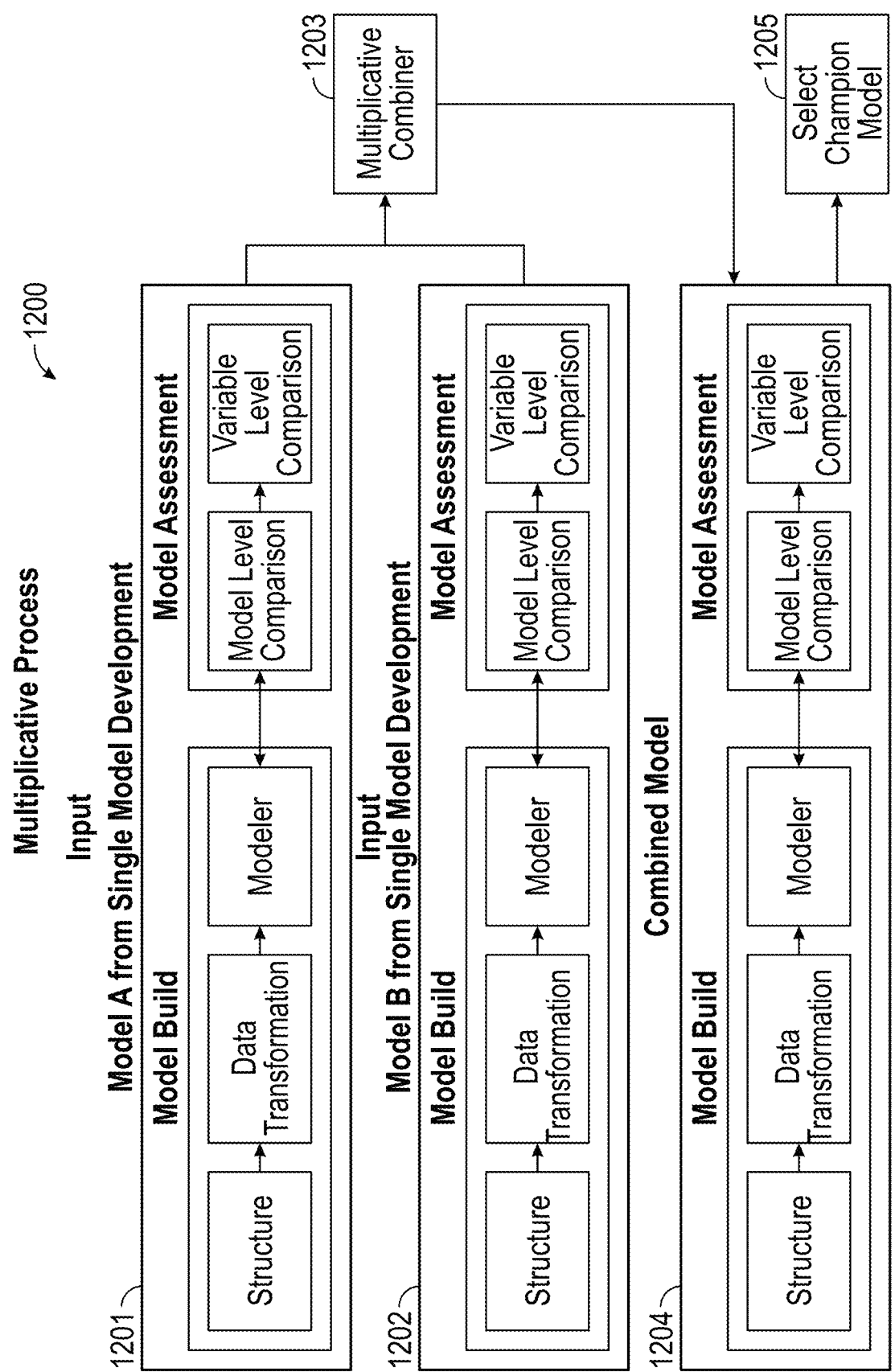
FIG. 12A is an illustration of an exemplary multiplicative technique for combining two data models in accordance with one aspect of the present disclosure.

FIG. 12A is an illustration of an exemplary multiplicative technique 1200 for combining two models. In particular, the technique 1200 illustrates a first model 1201 and a second model 1202, each of which may be generated or built according to the technique 100 as discussed with respect to FIG. 1. The technique 1200 includes a multiplicative combiner 1203 which may take, as inputs, the first model 1201 and the second model 1202, and may output a combined model 1204. FIG. 12A depicts an optional refitting of the model 1204 after combination.

According to some embodiments, the multiplicative combiner 1203 may multiply the values included in the first model 1201 and the second model 1202 to generate the combined model 1204. Generally, the multiplicative process addresses theoretical issues associated with combining distributions in a multiplicative way including the appropriate reconstruction of combined parameter estimates. In certain embodiments, the theoretical mathematical constructs of the combined distribution are automatically created. Additionally, the technique 1200 includes a champion selector 1205 that may facilitate the selection, storage, and management of a champion model.

Exemplary Additive Technique

Figure 12B:
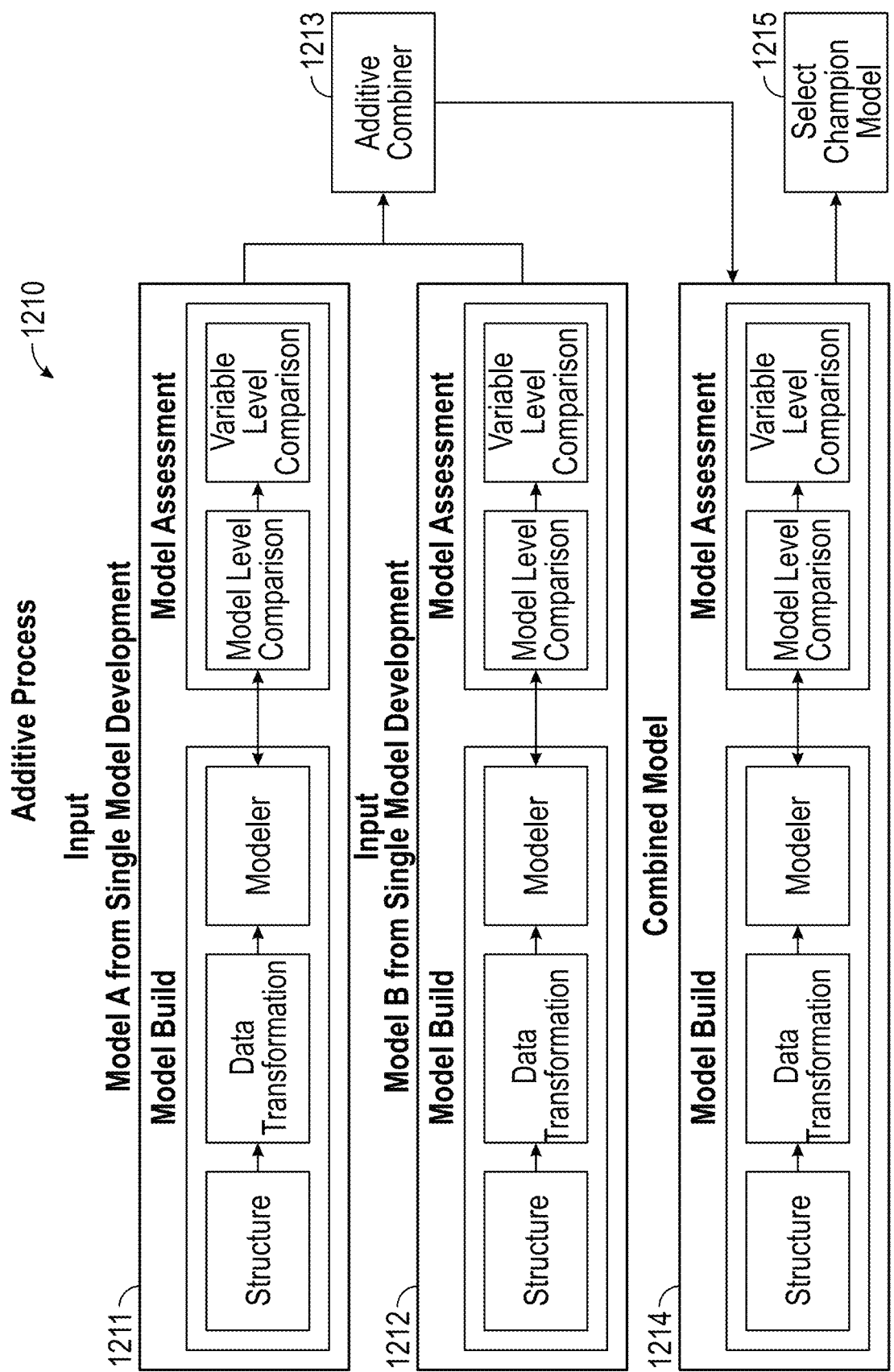
FIG. 12B is an illustration of an exemplary additive technique for combining two data models in accordance with one aspect of the present disclosure.

FIG. 12B is an illustration of an exemplary additive technique 1210 for combining two models. In particular, the technique 1210 illustrates a first model 1211 and a second model 1212, each of which may be generated or built according to the technique 100 as discussed with respect to FIG. 1. The technique 1210 includes an additive combiner 1213 which may take, as inputs, the first model 1211 and the second model 1212, and may output a combined model 1214. FIG. 12B depicts an optional refitting of the model 1214 after combination.

According to some embodiments, the additive combiner 1213 may add the values included in the first model 1211 and the second model 1212 to generate the combined model 1214. Generally, the additive process addresses theoretical issues associated with combining distributions in an additive way including the appropriate reconstruction of combined parameter estimates. In certain embodiments, the theoretical mathematical constructs of the combined distribution are automatically created. Additionally, the technique 1210 includes a champion selector 1215 that may facilitate the selection, storage, and management of a champion model.

Exemplary Multiplicative Model Combination Interface

In general, the present embodiments may include a multiplicative process multiplicative combiner, such as shown in FIG. 12A. The objectives and functionality of this combiner may include allowing analysts to combine multiple single models into a combined model. The multiplicative process addresses theoretical issues with combining distributions in a multiplicative way including the appropriate reconstruction of combined parameter estimates. Theoretical mathematical constructs of the combined distribution may be created automatically. The combiner may also facilitate selection, storage, and management of a champion model.

Figure 13A:
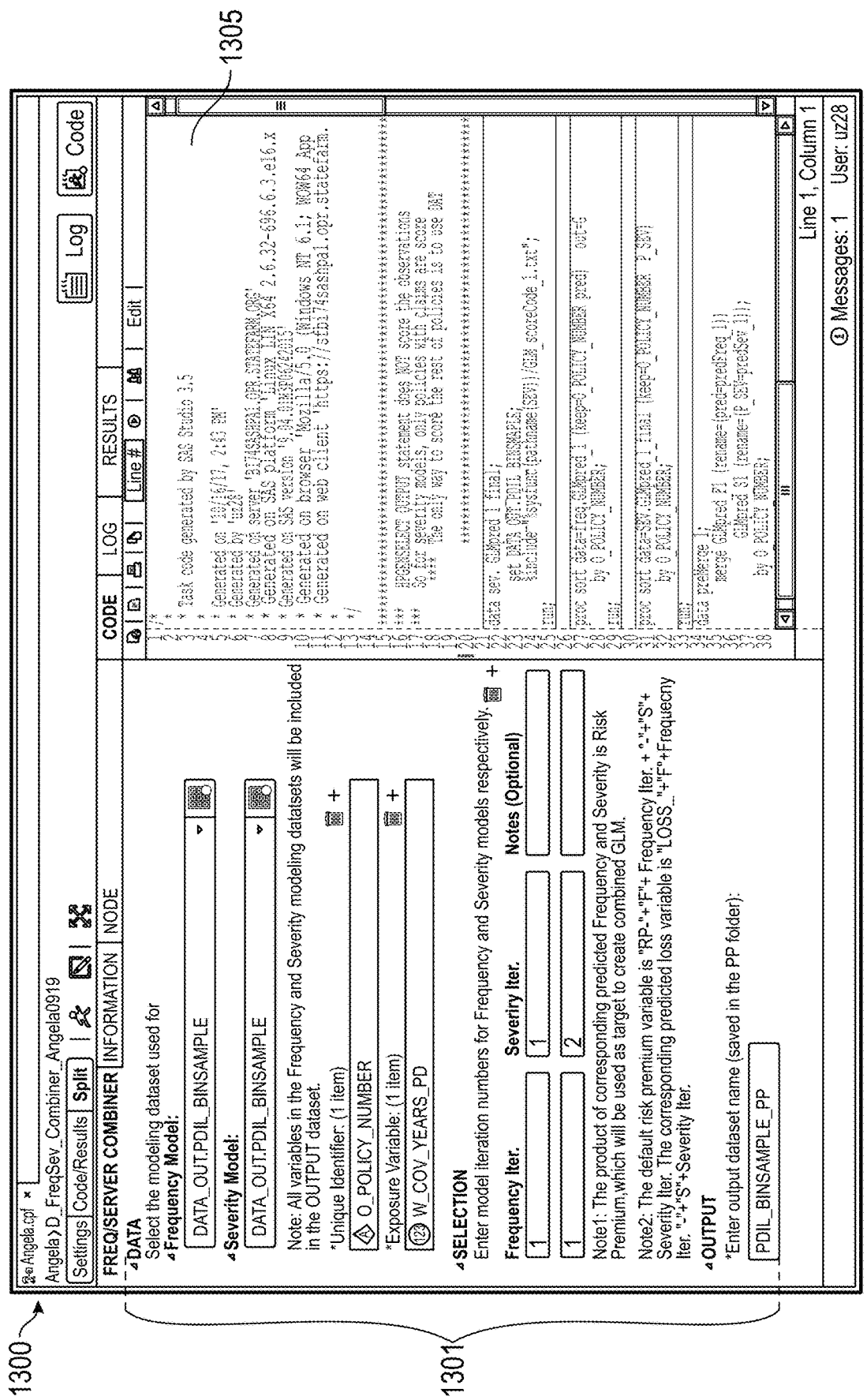
FIG. 13A illustrates an exemplary interface associated with a multiplicative data model combination technique in accordance with one aspect of the present disclosure.

More specifically, FIG. 13A illustrates an exemplary interface 1300 associated with the multiplicative model combination technique. The interface 1300 may include an input window 1301 into which an individual may specify various information and parameters, including: a frequency model dataset, a severity model dataset, a unique identifier, an exposure variable, model iteration numbers for each of the frequency and severity models, and an output dataset name.

The interface 1300 may further include a coding window 1305 that may be displayed alongside the window 1301, or in a different location. In association with the individual inputting information into the window 1301, the coding window 1305 may automatically populate with program code that corresponds to the inputted information. For example, when the individual enters the unique identifier in the window 1301, the coding window 1305 may automatically generate program code indicating the entered unique identifier (as shown: "O_POLICY_NUMBER"). In this regard, the platform enables automatic program code generation corresponding to inputted information associated with the multiplicative model combination technique.

Exemplary Additive Model Combination Interface

In general, the present embodiments may include an additive process additive combiner, such as shown in FIG.

12B. The objectives and functionality of this combiner may include allowing analysts to combine multiple single models into a combined model. The additive process addresses theoretical issues with combining distributions in an additive way including the appropriate reconstruction of combined parameter estimates. Theoretical mathematical constructs of the combined distribution may be created automatically. The combiner may also facilitate selection, storage, and management of a champion model.

Figure 13B:
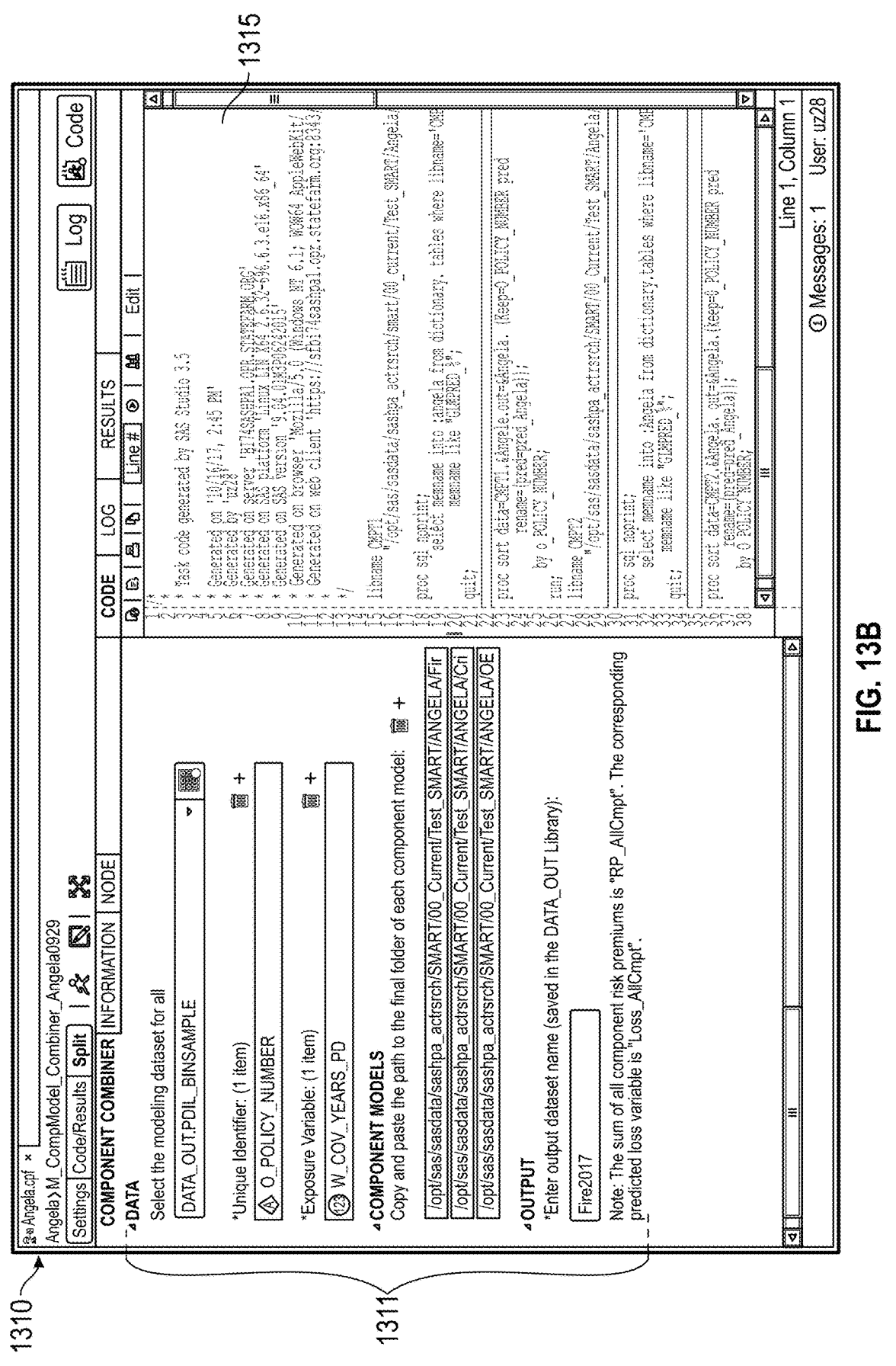

More specifically, FIG. 13B illustrates an exemplary interface 1310 associated with the additive model combination technique. The interface 1310 may include an input window 1311 into which an individual may specify various information and parameters, including: a modeling dataset, a unique identifier, an exposure variable, a set of component models, and an output dataset name.

The interface 1310 may further include a coding window 1315 that may be displayed alongside the window 1311, or in a different location. In association with the individual inputting information into the window 1311, the coding window 1315 may automatically populate with program code that corresponds to the inputted information. For example, when the individual enters the unique identifier in the window 1311, the coding window 1315 may automatically generate program code indicating the entered unique identifier (as shown: "O_POLICY_NUMBER"). In this regard, the platform enables automatic program code generation corresponding to inputted information associated with the additive model combination technique.

Exemplary Champion Model Selection Interface

The present embodiments may facilitate selection of a champion model. Champion model results may be stored and managed within the application structure. Work files, temporary models and output may be automatically managed and cleaned up as needed. The integration of folder structure and automated processes for evaluation, cleanup and management of the model results within a single tool is believed to represent a new approach to modeling processes.

Figure 13C:
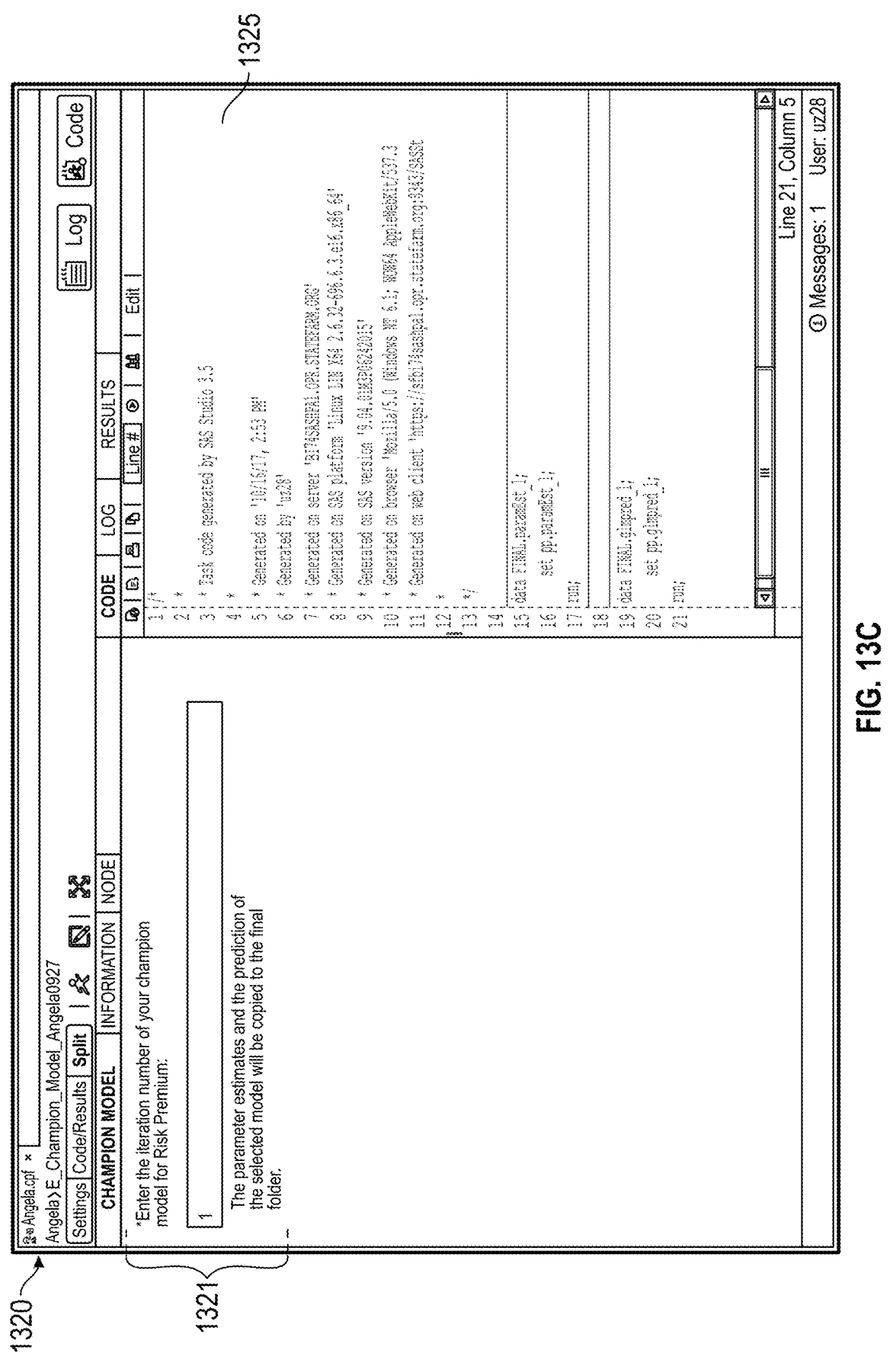

FIG. 13C illustrates an exemplary interface 1320 associated with selecting a champion model. The interface 1320 may include an input window 1321 into which an individual may specify various information and parameters, including an iteration number for a champion model.

The interface 1320 may further include a coding window 1305 that may be displayed alongside the window 1321, or in a different location. In association with the individual inputting information into the window 1321, the coding window 1325 may automatically populate with program code that corresponds to the inputted information. For example, when the individual enters the iteration number in the window 1321, the coding window 1325 may automatically generate program code indicating the entered iteration number (as shown: "1"). In this regard, the platform enables automatic program code generation corresponding to inputted information associated with the champion model selection.

Exemplary Method of Enabling Management of Data Models

Figure 14:
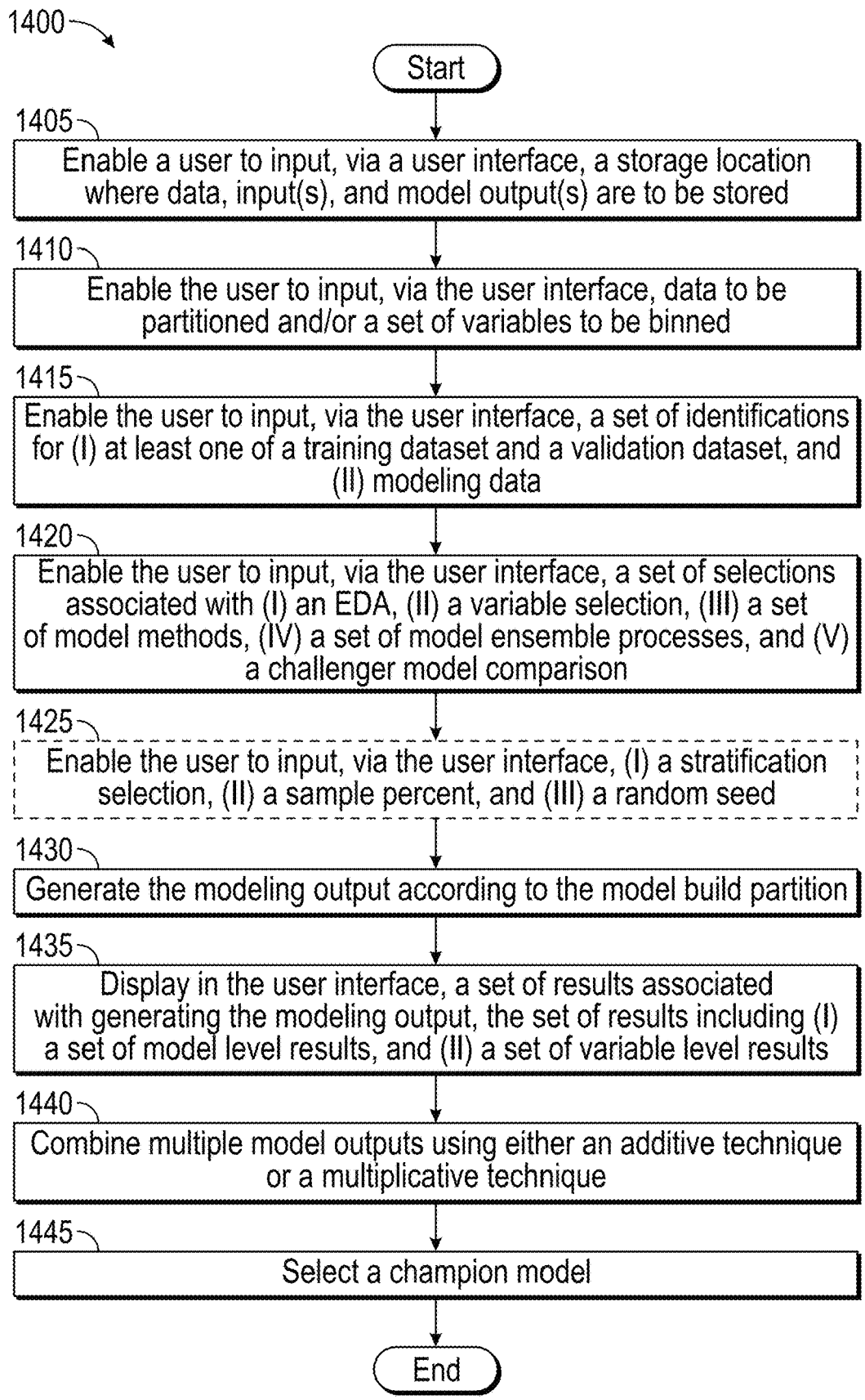
FIG. 14 depicts a block diagram of an exemplary computer-implemented method of enabling management of data models in accordance with one aspect of the present disclosure.

FIG. 14 depicts a block diagram of an exemplary computer-implemented method 1400 of enabling management of data models. In particular, the method 1400 may be associated with building one or more models, combining the one or more models, and selecting a champion model. According to some embodiments, the method 1400 may be performed by a computing device, such as a server computer, configured with or configured to connect to a user interface, where a user or individual may interact with the user interface. It should be appreciated that the functionalities of the method 1400 are exemplary, and that additional or alternative functionalities are envisioned.

The method 1400 may begin when the computing device generates a model build partition. In particular, the computing device may enable (block 1405) the user to input, via the user interface, a storage location where one or more of the following may be stored: data, a set of inputs, and a set of model outputs. In some embodiments, the storage location may be local to the computing device or to another device (e.g., within a distributed database).

The computing device may further enable (block 1410) the user to input, via the user interface, data to be partitioned and/or a set of variables to be binned. In particular, the computing device may enable the user to input, for each of the set of variables, (i) a binning technique, (ii) a number of bins, and/or (iii) a binned value. The computing device may enable (block 1415) the user to input, via the user interface, a set of identifications for (i) at least one of a training dataset and a validation dataset, and/or (ii) modeling data. According to certain embodiments, the modeling data may be associated with one or more different modeling techniques, including GLM, GAM, ELM, and/or others. In one implementation, the set of identifications for the modeling data may include a model type, a distribution, a link function, and/or a unique identifier. In an additional or alternative implementation, the set of identifications for the modeling data may include a target risk variable and a target exposure variable.

The computing device may enable (block 1420) the user to input, via the user interface, a set of selections associated with (i) an EDA, (ii) a variable selection, (iii) a set of model methods, (iv) a set of model ensemble process, and/or (v) a challenger model comparison. In some embodiments, the set of selections associated with the EDA may include an input of whether to run the EDA using the validation dataset and the training dataset (i.e., the entire dataset), or using the training dataset. Further, the set of selections associated with the variable selection may include (i) whether to run the variable selection using the entire dataset or using the validation dataset, (ii) a set of model effects, and/or (iii) a set of variable selection techniques. Alternatively or additionally, the set of selections associated with the modeling methods may include (i) whether to generate the modeling output using the entire dataset or using the training dataset, (ii) a model iteration identification, and/or (iii) a set of model effects. The computing device may optionally enable (block 1425) the user to input, via the user interface, (i) stratification selection, (ii) a sample percent, and/or (iii) a random seed.

The computing device may generate (block 1430) the modeling output according to the model build partition. In some embodiments, the modeling output may be stored in the storage location inputted in block 1405, for access by the computing device and/or other devices.

The computing device may display (block 1435), in the user interface, a set of results associated with the generating the modeling output, where the set of results may include (i) a set of model level results, and/or (ii) a set of variable level results. In some embodiments, the set of model level results may include a set of prediction statistics, and the set of variable level results may include a set of main effects and/or a set of interaction relativity plots.

In certain embodiments, the modeling output may include a first model output and a second model output (and optionally additional model outputs). The computing device may combine (block 1440) multiple model outputs (i.e., the first model output and the second model output) using either an additive technique or a multiplicative technique, to generate a combined model(s). Additionally, the computing device may select (1445) a champion model from the any of the initial model outputs and the combined model(s). In some embodiments, the computing device may select the champion model according to various factors and parameters.

Exemplary Computing Device

Figure 15:
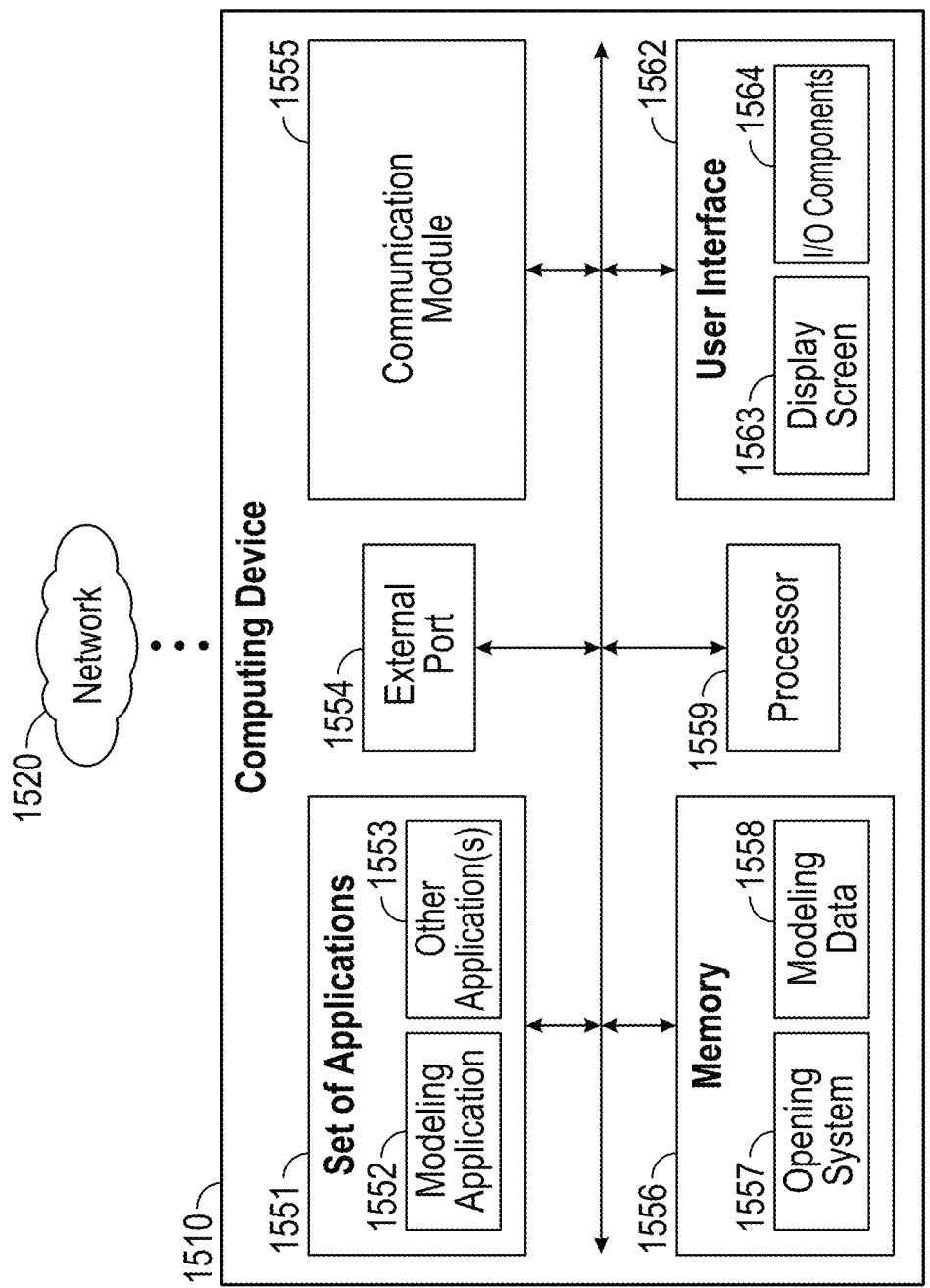
FIG. 15 illustrates a hardware diagram of an exemplary computing device in which the functionalities as discussed herein may be implemented, in accordance with one aspect of the present disclosure.

FIG. 15 illustrates a hardware diagram of an exemplary computing device 1510 in which the functionalities as discussed herein may be implemented. In particular, the computing device 1510 may support the model building, comparing, and selecting functionalities as discussed herein.

The computing system 1510 may include a processor 1559 as well as a memory 1556. The memory 1556 may store an operating system 1557 capable of facilitating the functionalities as discussed herein as well as a set of applications 1551 (i.e., machine readable instructions). For example, one of the set of applications 1551 may be a modeling application 1552 configured to facilitate various functionalities discussed herein. It should be appreciated that one or more other applications 1553 are envisioned.

The processor 1559 may interface with the memory 1556 to execute the operating system 1557 and the set of applications 1551. According to some embodiments, the memory 1556 may also include modeling data 1558, such as modeling data that may be used by the modeling application 1552. The memory 1556 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In one implementation, the computing device 1510 may interface with external storage, such as one or more databases. Additionally or alternatively, the memory 1556 (and/or any external storage) may be included as part of a distributed database.

The computing system 1510 may further include a communication module 1555 configured to communicate data via one or more networks 1520. According to some embodiments, the communication module 1555 may include one or more transceivers (e.g., WWAN, WLAN, and/or WPAN transceivers) functioning in accordance with IEEE standards, 3GPP standards, or other standards, and configured to receive and transmit data via one or more external ports 1554. For example, the communication module 1555 may receive, from an external electronic device, various datasets, modeling parameters, and/or the like.

The computing device 1510 may further include a user interface 1562 configured to present information to a user and/or receive inputs from the user. As shown in FIG. 15, the user interface 1562 may include a display screen 1563 and I/O components 1564 (e.g., ports, capacitive or resistive touch sensitive input panels, keys, buttons, lights, LEDs). According to some embodiments, a user may access the computing device 1510 via the user interface 1562 to review information, make changes, input modeling parameters, and/or perform other functions.

In some embodiments, the computing device 1510 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 1559 (e.g., working in connection with the operating system 1557) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

Smart Tool Overview

The present embodiments may relate to, inter alia, a SMART (Statistical Modeler using Advanced Ratemaking Techniques) Tool, or Application, that may include two graphical-user interfaces (GUIs) that allow the user to model ratemaking information (e.g., frequency, severity, and/or pure premium). The SMART Tool may contain several custom tasks that help the user to produce a finished model.

The SMART Tool, in one aspect, is designed to help users who may not have much SAS or other coding knowledge build a successful pricing model. However, being somewhat familiar with both environments (SAS Studio and Visual Analytics) and basic ratemaking principles, especially those covered in CAS Exam 5 Basic Ratemaking, may be helpful to use the SMART Tool to its full potential.

A. Generalized Linear Models (GLMs)

GLMs model the linear relationship between a response, or dependent, variable, and a set of predictors, also called input or independent variables. In property and casualty insurance ratemaking applications, the response variable may be usually one of the following: claim frequency, claim severity, pure premium, or loss ratio.

Examples of ratemaking predictors are type of vehicle, age, or marital status for personal auto insurance; construction type, building age, or amount of insurance (AOI) for homeowners insurance.

The GLM relationship is written as the following:
$g(\mu_i) = \beta_0 + \beta_1 x_{i1} + \beta_2 x_{i2} + \ldots + \beta_p x_{ip}$.

Where $g(\mu_i)$ is the link transformation applied to the mean $\mu_i$, $\beta_0$ is the intercept, and $\beta_i$ is the coefficient applied to each $x_i$. For ratemaking, a log link is applied, yielding multiplicative factors, which is the most commonly used rating plan in ratemaking, and where $\mu_i = \exp(\beta_0 + \beta_1 x_{i1} + \beta_2 x_{i2} + \ldots + \beta_p x_{ip}) = e^{\hat{\beta}_0} \times e^{\hat{\beta}_1 x_{i1}} \times \ldots \times e^{\hat{\beta}_p x_{ip}}$.

B. Generalized Additive Models (GAMs)

GAMs are models in which relationships between the individual predictors and the dependent variable follow smooth patterns that may be linear or nonlinear. The smooth relationships may be estimated simultaneously to predict the expected value of a response variable Y according to the following: $g(E(Y)) = \beta_0 + f_1(x_1) + f_2(x_2) + \ldots + f_m(x_m)$.

In this equation, the response variable, Y, is related to a set of predictor variables, $x_i$, where E(Y) denotes the expected value and g(Y) denotes the link function that links the expected value to the predictor variables $x_i$. A set of functions $f_i$ denote functions with a specified parametric form (e.g., polynomial), non-parametric form, or semi-parametric form, that are estimated by non-parametric means. Generally, GAMs enable regularization, interpretability, flexibility, and automation. Accordingly, GAMs provide a regularized and interpretable solution, especially in situations in which the model contains nonlinear effects.

C. Ensemble Learning Methods (ELMs)

ELMs employ multiple learning algorithms using a finite set of alternative models to assess predictive performance. Generally, the goal of ELMs is to combine multiple hypotheses to form a hopefully better hypothesis. ELMs may be implemented using various algorithms, such as decision trees (e.g., Random Forest), and may be implemented sequentially or in parallel. Additionally, ELMs may be of various types, including: Bayes optimal classifier, bootstrap aggregating, boosting, Bayesian parameter averaging, Bayesian model combination, bucket of models, and stacking. Because ELMs employ multiple learning algorithms, the results may be more accurate than those of single learning algorithms, as the results may average out biases, reduce variance, and reduce instances of overfitting.

D. Modeler

The entire process may be executed on a dedicated server. Data may be obtained from various sources, but in order to use the SMART Tool application, the data should preferably be uploaded and stored on the server. The SMART Tool may allow the user to custom build models and perform their statistical analysis on the predictors they select.

Two exemplary process flows described herein are suggestions on how to use the SMART Tool to its full potential. As detailed further herein, FIG. 1 and associated text explains the process to build a single model, includes a model build partition and a model assessment partition. FIGS. 12A and 12B and associated text explains the process to build a combined model, with FIG. 12A focusing on the multiplicative process, and FIG. 12B focusing on the additive process.

In one embodiment, visualization may take place in SAS Visual Analytics or other program, which may be on the dedicated server. Datasets created in the Modeler may be automatically pushed to the server with each iteration performed.

E. Server Files and Folders

Figure 18:
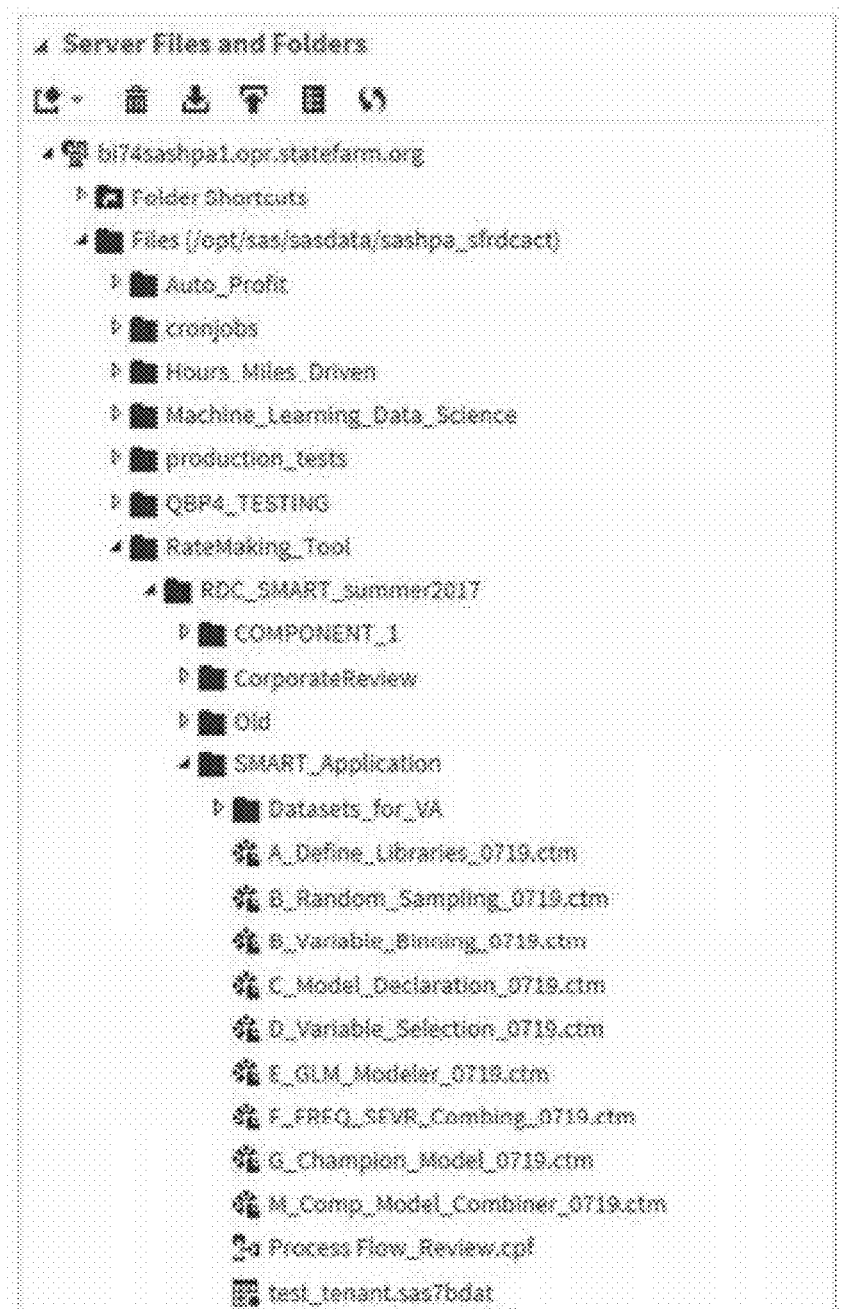
FIG. 18 illustrates exemplary files and folders associated with a server.

Creating Files and Folders may be considered Task A in one embodiment. The server's Files and Folders, shown in FIG. 18, may be where the permanent files are located. This may be where a user will access the SMART Tool or application tasks. The SMART Tool or application may also create a ROOT directory in the first step to hold the datasets and files created by each task.

Libraries may be where the datasets are stored. The SMART Tool or application may also create several libraries, or folders/files, that hold datasets created from, or during, the modeling process.

A process flow may be used to visualize the order of the tasks. In one embodiment, the user may use a combination of tasks to create their own customized process flow. For instance, to create a custom process flow, the user may be able to click an icon and select a Process Flow tab or button from a dropdown list or menu. After which, a user may drag and drop various tasks to add them to new process flow that may be graphically depicted. Also, the user may be allowed to remove a task, such as by clicking upon an icon and hitting delete.

In order to have accurate models, the data may need to be properly cleaned and prepared beforehand. A "response variable" may be calculated from selected target risk variables and target exposure variables in the tool prior to building a statistical model are calculated. Exemplary response variables may include, for insurance-related embodiments, calculated Frequency, calculated Severity, and/or calculated Loss Ratio.

It should be noted that users should make sure the variable types they are using are correct. For example, if the user wants to use a numeric variable as a categorical variable in the modeling, then they will need to change its variable type to a categorical variable before using the Modeler. Otherwise, the variable will be filtered out, or be modeled incorrectly due to the underlying code.

F. Define Libraries and Create Folders

Figure 19:
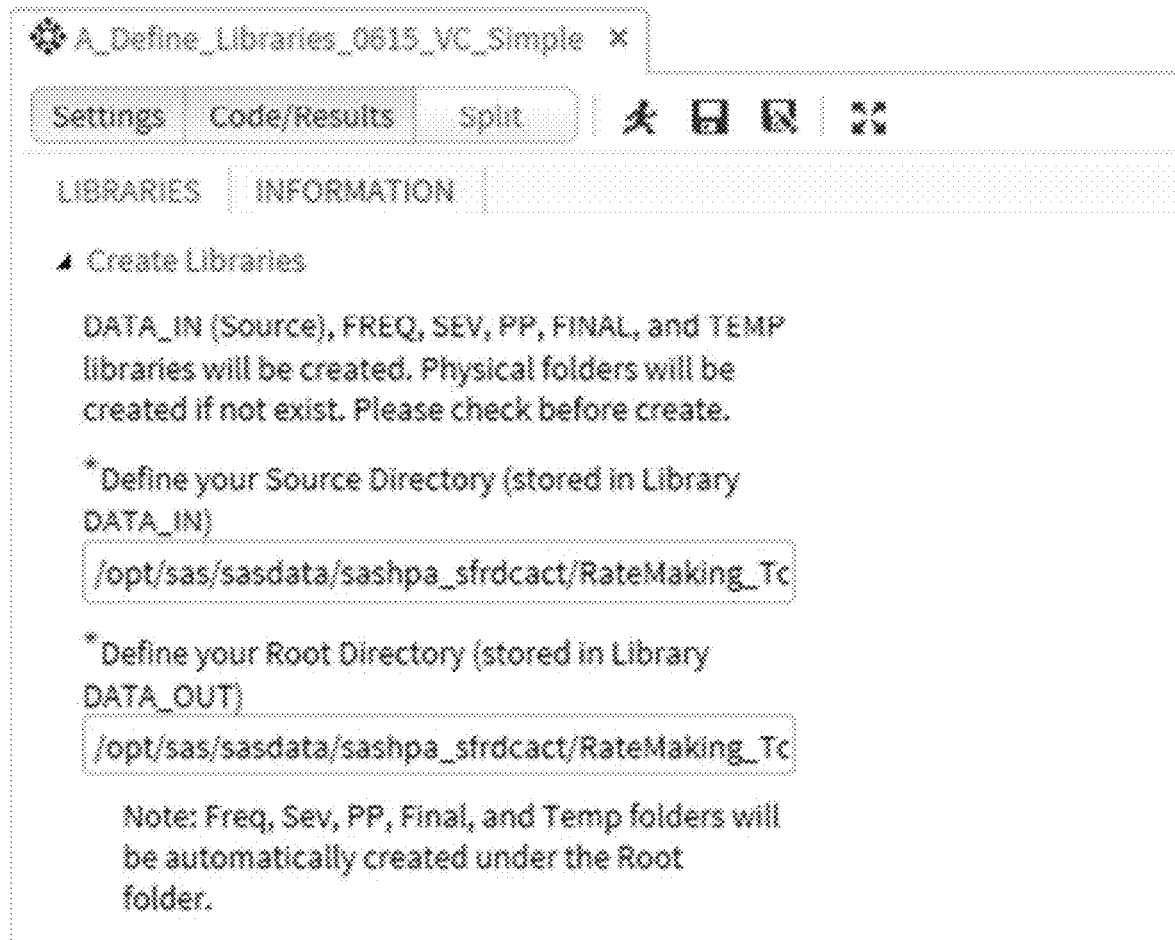
FIG. 19 illustrates exemplary user inputs associated with creating libraries.

The first step in building a model (Task A) may be to tell the SMART Tool or application where the data is located, and where to store new data. This task may ask for two user inputs, as shown in FIG. 19. This first user input may be a DATA_IN (SOURCE) Directory. This may be the server path where the input dataset is located.

The second user input may be a DATA_OUT (ROOT) Directory. This may be the server path where the output datasets created by the tool are located. If the indicated directory does not exist, this task will create one. Datasets from two potential Task B's (such as Random Sample, and Variable Binning) may appear here.

In one embodiment, the ROOT Directory may have five (5) subdirectories for insurance-related embodiments: (1) FREQ: holds frequency datasets and associated files; (2) SEV: holds severity datasets and associated files; (3) PP: holds pure premium datasets or combined risk premium datasets and associated files; (4) FINAL: holds the champion models selected; and/or (5) TEMP: temporary files are kept here, such as the intermediate dataset from EDA. This task may also create SAS or other libraries with corresponding names. This way, datasets located under each subdirectory may also be located in the library of the same name.

It should be noted that this task may need to be run once for each component, and each time the user starts a SAS Studio session. For example, if the user is building frequency and severity models using the same dataset, Task A (which may include defining libraries and/or creating files and folders) only needs to be run only once. If the user logs out or desires to build a different component, they will need to run Task A.

G. Variable Binning

Variable Binning may be an optional Task B, but is recommended. Binning creates groups for continuous variables that may facilitate modeling. As examples, "pseudo-quantile binning" may return equal number of results per bin. Currently the default option, pseudo-quantile is an approximation of quantile binning, and returns similar results. "Bucket binning" may create bins of equal width. And, "winsorized binning" may be similar to bucket binning except that the tails are cut off to ensure a smoother binning result and remove outlier influence.

H. Random Sampling

Like the previous task, Random Sampling is another optional Task B that is recommended, but not required. The user may choose to use only one Task B, or both in any order.

The random sampling task may be based upon stratified sampling. The data may be partitioned into two groups based upon the selected stratifying variable(s), then a sample from each group may be taken based upon a predefined portion. In one embodiment, the sampled variables may be indicated in a "Selected" column created in this task by assigning each value either a "0" or "1", and the GLM (or GAM, ELM, or the like) created or programmed by the system may use the sampled data to do the modeling.

Further, a random seed may be used to specify the initial seed for random number generation. This feature may be useful if the user wanted to compare or replicate several sampling attempts later by making sure the initial seed is the same for all attempts.

I. Model Declaration

The Model Declaration task may be used to specify the target risk variable, target exposure variable, model type (e.g., Frequency, Severity, or Pure Premium for insurance-related embodiments), and predictors and/or interaction variables used in the Variable Selection task.

A Response Variable may be calculated from a target risk variable and/or a target exposure variable. In insurance-related embodiments, in a Frequency Model, the Response Variable may be Claim Count per exposure, or a frequency variable. In a Severity Model, the Response Variable may be Loss Amount per event, or a severity variable. In a Pure Premium Model, the Response Variable may be Loss Amount per exposure, or a pure premium variable. A Pure Premium Model may also be used to refit Pure Premium models previously created as combination of frequency and severity models.

A Weight Variable may allow users to give more 'weight' to rows that carry greater risk. In a Frequency Model, usually Exposure (i.e., Earned House Years) may be used, and the Response and Weight variables may become Frequency=Claim Count/Exposure.

In a Severity Model, Claim Count may be used, and Severity=Loss/Claim Count.

In a Pure Premium Model, Exposure (EHY) may be used, and PP=Loss/Exposure.

In some embodiments, a drop down menu may be used to select the specified model type. This feature may be used to direct output datasets to the right folder when they are modeled.

The user may select which distribution best fits the data. For instance, Poisson may be used for Frequency. Negative Binomial may also be used for Frequency. Gamma may be used for Severity and/or Pure Premium. Tweedie may be used for Pure Premium, and may use a combination of Poisson (Frequency) and Gamma (Severity).

A link function may be used that provides flexibility in transforming the equation and relating the model prediction to its predictors. A Log Link may have the property of producing a multiplicative structure, making it the most intuitive link function to use in ratemaking.

A unique identifier may be used to identify the correct rows to merge together in future tasks, and may use a Policy Number or another similar unique variable.

Variable Selection is highly recommended to ensure the model is using statistically valid predictors. All potential predictors may be selected to be used in the model, including those to be used for interaction terms. Continuous Variables may be used that are numeric variable that represent a measurement on a continuous scale, such as age or AOI.

Offset variables may also be used. For instance, a 'fixed' variable that is part of the rating plan, but is not given a coefficient in the GLM, such as a base rate or deductible. The GLM equation is represented as $g(\mu_1)=\beta_0+\beta_1 x_{i1}+\beta_2 x_{i2}+\ldots+\beta_p x_{ip}+\text{offset}$.

Preferably, the offset variable is a continuous variable.

Some variables might have a combined effect on the target variable. In other words, the effect of one predictor might depend upon the value of another, and vice-versa. The combined effect of these variables is referred to as an interaction term.

A variable selection method may be performed to further narrow down the predictors. The output is a variable selection summary that the user can use. As examples, "backward selection" may start with all predictors, and each step may delete the variable with the least contribution until a stopping condition is reached. "Forward selection" may start with no predictors, and each step may add the most significant variable until a stopping condition is reached.

"Stepwise selection" may be used, and may be a modification of forward selection, but effects selected may be removed later. Stepwise selection uses the same methods of adding and removing effects as forward and backward selection, respectively. If at any step an effect is not significant, it may be removed.

"Lasso selection" may be used that includes the sum of the absolute values of the regression coefficients that may be constrained to be smaller than a specified parameter. "Variance based selection" may identify a group of variables that jointly explain the maximum amount of variance in the response variables. "Random forest selection" may be used that generates a random forest that evaluates variable importance using decision trees.

In some embodiments, the two previously created frequency and severity models may be combined into one Pure Premium model. Additionally or alternatively, Pure Premium models from all components may be combined. For example, the user may create an All Peril Pure Premium Model from separate fire, water, weather, hurricane, etc. Peril Pure Premium Models.

Exemplary Process Flow

Figure 16:
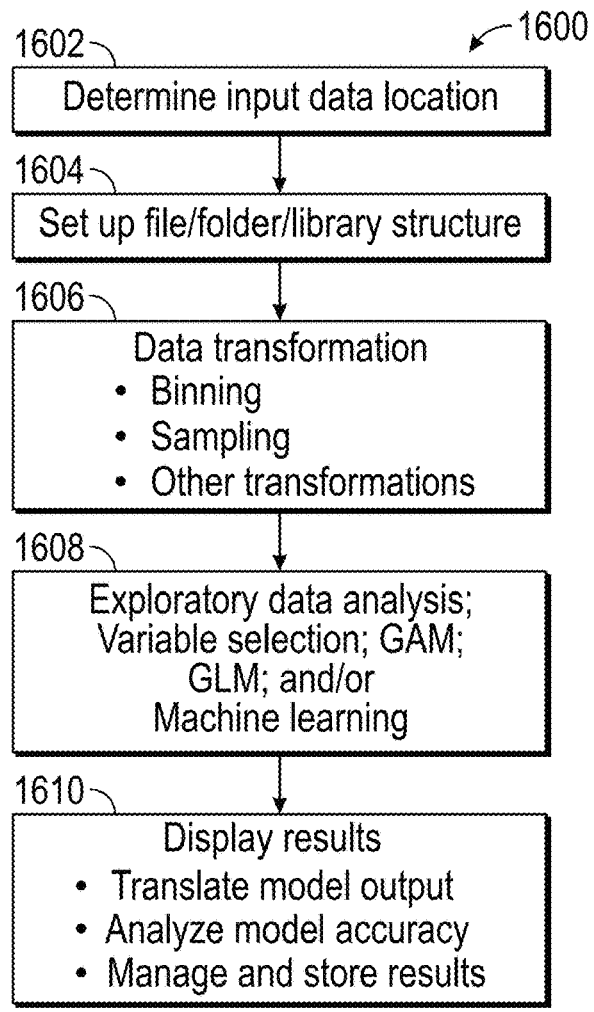
FIG. 16 illustrates an exemplary computer-implemented process flow.

FIG. 16 illustrates an exemplary computer-implemented process flow 1600. The process flow 1600 may include determining input data location 1602, and/or allow the user to select files or folders with the input data to be input into the model(s) created by the SMART Tool. For instance, in insurance-related embodiments, the input data may include ratemaking input data; customer data; data related to historical or current insurance claims; data related to premiums, discounts, loss, exposures; and other types of input data, including that discussed elsewhere herein.

The process flow 1600 may include setting up file, folder, and/or library structures 1604, such as the structures discussed elsewhere herein. The structures may include structures for input and output (i.e., results generated by the model(s)) structures. In one embodiment, the user may enter input and output folders or files, and the system may automatically build or set up the input and/or output folder and file structures.

The process flow 1600 may include data transformation 1606. For instance, variable binning and random sampling may be used to transform the input data. The data may be grouped into appropriate sizes that increase the accuracy of the modeling. Initial data groups may also be combined to increase modeling accuracy. Other transformations may be performed on the input data, including those transformations discussed elsewhere herein.

As discussed elsewhere herein, the process flow 1600 may include exploratory data analysis; variable selection; and model creation 1608 (e.g., GAM, GLM, ELM, or other data science models). The variable selection may determine which variables should be selected. For instance, miles; home, vehicle or customer age; home or vehicle features; smart home features; autonomous or semi-autonomous vehicle features; state features; geographic related features; home or vehicle telematics data features; and/or other data features, including those discussed elsewhere herein, may be selected for various insurance-related or rating models, including those related to auto or homeowners insurance.

Turning briefly to FIGS. 3 to 5, for instance, on the left hand side of the user interface, the user may be presented with a series of options or selections. The right hand side depicts the programming code, such as object code, that would have to be typed in by the user if they were not using the user interface. The user interface and process described herein alleviates the need for the user to be a programmer and/or to understand how to write the programming code, such as SAS. For instance, the user selections of options on the left hand side of the user interface automatically populate the programming code on the right hand sider of the user interface.

The present embodiments allow users to build code by selecting options or icons—with the resulting code having no errors or being free from programming errors. In other words, the user interface acts as a template to efficiently or effectively build code, such as SAS code, without any programming knowledge and that is error free. As a result, the user can focus on the options or selections that they would like in their model, and not on the actual coding itself.

Machine learning and/or artificial intelligence techniques may also be used to increase the accuracy of the models, including GLM, GAM, and/or ELM models, created. For instance, as new claim data becomes available, machine learning techniques may be used to further revise the models to account for the new information. This may be especially useful as newer technologies become available to customers—such as new make and models of vehicles, including electric or hybrid vehicles, or new autonomous or semi-autonomous features for auto insurance; or new smart or intelligent home features, or new types of construction or construction materials for homeowners or renters insurance.

The process flow 1600 may include displaying the modeling results 1610, such as on a display screen. After the GLM or other model (e.g., GAM or ELM) is created, and the input data is analyzed or processed by the GLM or other model (e.g., GAM or ELM), a processor may translate the model output. Analysis may then be performed to determine how "good" the model is. For instance, confidence levels may be estimated. Also, for auto insurance models, frequency and severity models, and/or other models (e.g., property damage or bodily injury models) may be combined into ensembles in order to increase accuracy.

Figure 17:
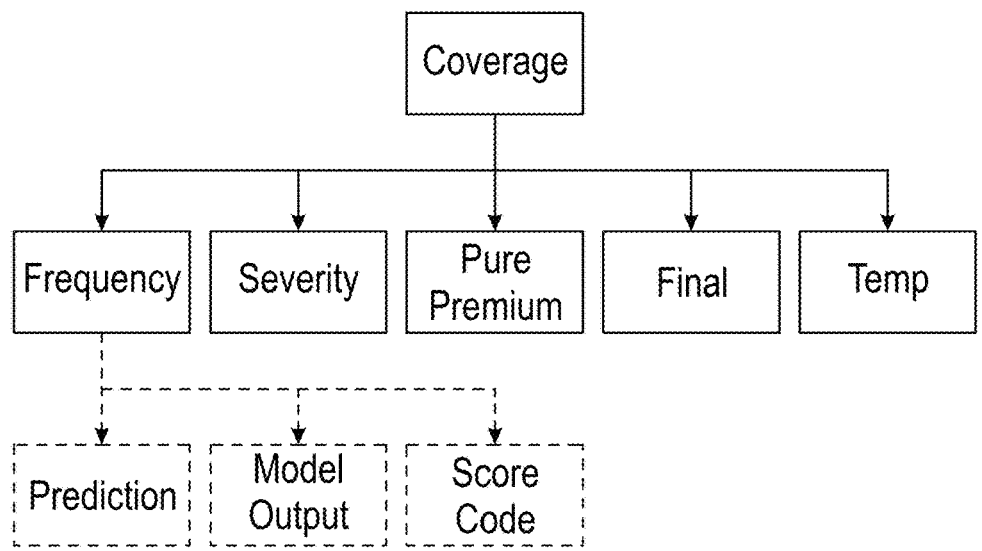
FIG. 17 illustrates an exemplary modeling folder structure for an auto insurance-related embodiment.

Certain embodiments may relate to, inter alia, insurance, banking, or financial services. As an example, FIG. 17 illustrates an exemplary modeling folder structure for an auto insurance-related embodiment. The SMART Tool may automatically create a modeling folder structure using the programming language created by the SMART Tool. Analysts may identify the location of data within the tool using the structure. As shown in FIG. 17, the file or folder structure may include a high level folder associated with Coverage, and sub-folders may include Frequency, Severity, Pure Premium, Final, Temp, and/or other sub-folders.

Additional Exemplary Embodiments

In one aspect, a computer-implemented method in a computing device of enabling the management of data models and/or creating models may be provided. The method may include (1) generating, by a computer processor, a model build partition, including enabling a user to input, via a user interface: a storage location, file, folder, or library where a modeling output is to be stored; a set of variables to be binned; a set of identifications and/or user selections for (i) modeling data, and/or (ii) a data model modeling methods to be created and/or programmed by the computer processor; and/or a set of selections associated with (i) an exploratory data analysis (EDA), (ii) a variable selection, (iii) a set of modeling methods, and/or (iv) model ensemble processes; (2) generating, by the computer processor, the modeling output according to the model build partition; and/or (3) displaying, in the user interface, a set of results associated with generating the modeling output, the set of results including: (a) a set of model level results, and/or (b) a set of variable level results. The method may include additional, less, or alternate actions, including those discussed elsewhere herein.

In one implementation, enabling the user to input the set of variables to be binned may include enabling the user to input, for each of the set of variables, (i) a binning technique, (ii) a number of bins, and/or (iii) a binned value. Generating the model build partition may further include enabling the user to input, via the user interface, (i) a stratification selection, (ii) a sample percent, and/or (iii) a random seed.

Enabling the user to input the set of identifications for the modeling data may include enabling the user to input (i) a model type, (ii) a distribution, (iii) a link function, and/or (iv) a unique identifier. Additionally or alternatively, enabling the user to input the set of identifications for the modeling data may include enabling the user to input a target risk variable and/or a target exposure variable.

Enabling the user to input the set of selections associated with the exploratory data analysis (EDA) may include enabling the user to input whether to run the EDA using the entire dataset or using the training dataset. Enabling the user to input the set of selections associated with the variable selection may include enabling the user to input (i) whether to run the variable selection using the entire dataset or using the training dataset, (ii) a set of model effects, and/or (iii) a set of variable selection techniques. Enabling the user to input the set of selections associated with the modeling methods may include enabling the user to input (i) whether to generate the modeling output using the entire dataset or using the training dataset, (ii) a model iteration identification, and/or (iii) a set of model effects.

Displaying the set of model level results may include displaying, in the user interface, a set of prediction statistics. Displaying the set of variable level results may include displaying, in the user interface, a set of main effects and/or a set of interaction relativity plots.

The modeling output may include multiple model outputs, and wherein the method may further include combining multiple model outputs using either an additive technique or a multiplicative technique. In an implementation, the method may further include, after combining the first model output and the second model output: selecting a champion model.

In another aspect, a computer system for enabling the management of data model and/or creating a data model may be provided. The system may include a user interface; a memory storing a set of computer-executable instructions; and/or a processor interfaced with the user interface and the memory, and configured to execute the computer-executable instructions to cause the processor to: (1) generate a model build partition, including enabling a user to input, via the user interface: a storage location, file, folder, or library where a modeling output is to be stored; a set of variables to be binned; a set of identifications and/or user selections for (i) modeling data, and/or (ii) modeling methods to be created and/or programmed by the computer processor; and/or a set of selections associated with (i) an exploratory data analysis (EDA), (ii) a variable selection, (iii) a set of modeling method(s); and/or (iv) model ensemble process(es); (2) generate the modeling output according to the model build partition, and/or cause the user interface to display a set of results associated with generating the modeling output, the set of results including: (a) a set model level results, and/or (b) a set of variable level results. The system may include additional, less, or alternate functionality, including that discussed elsewhere herein.

In one implementation, the set of variables to be binned may include, for each of the set of variables, (i) a binning technique, (ii) a number of bins, and/or (iii) a binned value.

In one implementation, wherein the set of identifications for the modeling data may include a target risk variable and/or a target exposure variable. The set of selections associated with the exploratory data analysis (EDA) may include whether to run the EDA using the entire dataset and/or using the training dataset.

The set of selections associated with the variable selection may include (i) whether to run the variable selection using the entire dataset or using the training dataset, (ii) a set of model effects, and/or (iii) a set of variable selection techniques. The set of selections associated with the data model may include (i) whether to generate the modeling output using the entire dataset or using the training dataset, (ii) a model iteration identification, and/or (iii) a set of model effects. The set of model level results may include a set of prediction statistics. The set of variable level results may include a set of main effects and/or a set of interaction relativity plots.

The modeling output may include a first model output and a second model output, and wherein the processor is further configured to: combine multiple outputs using either an additive technique or a multiplicative technique. The processor may be further configured to, after combining multiple model output: select a champion model.

In another aspect, a computer-implemented method of building a data model and then model ratemaking information may be provided. The method may include, via one or more processors: (1) accepting user input that identifies a file or folder from which to retrieve ratemaking input data; (2) accepting user input that identifies a file or folder to which store results generated from a user-defined data model created using user-selections acting upon the ratemaking input data; (3) accepting user selected variables or other selections (such as user selected icons or buttons) related to the user-defined data model to be created; (4) translating the user selected variables or other selections into a programming language code that can be compiled, executed, and/or run by one or more processors to create the user-defined data model that is defined by the user selected variables or other selections (or otherwise creating the programming language code from the user selected variables or other selections to alleviate the need for the user to have coding knowledge); (5) compiling, executing, and/or running the programming language code to create the user-defined data model; (6) feeding the ratemaking input data into the user-defined data model created to model the ratemaking input data and generate modeling results, or otherwise modeling the ratemaking input data and generating the modeling results; and/or (7) displaying the modeling results, or other results generated by the user-defined data model acting upon the ratemaking input data to facilitate modeling ratemaking information. The method may include additional, less, or alternate actions, including those discussed elsewhere herein.

For instance, the user selected variables may include claim frequency, claim severity, pure premium, or loss ratio, and the data model may be related to insurance.

The user selected variables may include vehicle, make, model, vehicle age, driver age, or marital status, and the user-defined data model may be related to auto insurance. The user selected variables may also relate to autonomous or semi-autonomous vehicle features, systems, or technologies.

The user selected variables may include construction type, building age, or amount of insurance, and the user-defined data model may be related to homeowners insurance. The user selected variables may also relate smart or interconnected home features, systems, or technologies.

The ratemaking input data and/or the user-defined data model may be related to auto, homeowners, pet, renters, life, health, commercial, personal articles, or other types of insurance. Other embodiments are also envisioned in which the input data and/or user-defined data model are not related to insurance. For instance, the input data and/or user-defined data model may be related to banking or financial services.

In another aspect, a computer system configured to build a data model and then model ratemaking information may be provided. The computer system may include one or more processors and/or memory units, and/or a graphical user interface, configured to: (1) accept user input that identifies a file or folder from which to retrieve ratemaking input data; (2) accept user input that identifies a file or folder to which store results generated from a user-defined data model created using user-selections acting upon the ratemaking input data; (3) accept user selected variables or other selections (such as user selected icons or buttons) related to the user-defined data model to be created; (4) translate the user selected variables or other selections into a programming language code that can be compiled, executed, and/or run by the one or more processors to create the user-defined data model that is defined by the user selected variables or other selections (or otherwise create the programming language code from the user selected variables or other selections to alleviate the need for the user to have coding knowledge); (5) execute or run the programming language code to create the user-defined data model; (6) feed the ratemaking input data into the user-defined data model created to model the ratemaking input data and generate modeling results, or otherwise model the ratemaking input data and generate modeling results; and/or (7) display the modeling results, or other results generated by the user-defined data model acting upon the ratemaking input data to facilitate modeling ratemaking information. The system may include additional, less, or alternate functionality and/or components, including those discussed elsewhere herein.

In one implementation, the user selected variables may include claim frequency, claim severity, pure premium, or loss ratio, and the data model may be related to insurance. The user selected variables may include type of vehicle, make, model, vehicle age, driver age, or marital status, and the user-defined data model may be related to auto insurance. Additionally or alternatively, the user selected variables may include construction type, building age, or amount of insurance, and the user-defined data model may be related to homeowners insurance.

The ratemaking input data and/or the user-defined data model may be related to auto, homeowners, pet, renters, life, health, commercial, personal articles, or other types of insurance.

In another aspect, a computer-implemented method of building a data model and then model input data may be provided. The method may include, via one or more processors: (1) accepting user input that identifies a file or folder from which to retrieve input data; (2) accepting user input that identifies a file or folder to which store results generated from a user-defined data model created using user-selections acting upon the input data; (3) accepting user selected variables or other selections (such as user selected icons or buttons) related to the user-defined data model to be created; (4) translating, or otherwise converting, the user selected variables or other selections into a programming language code (such as the object code shown in some of the Figures herein) that can be compiled, executed, and/or run by one or more processors to create the user-defined data model that is defined by the user selected variables or other selections (or otherwise creating the programming language code from the user selected variables or other selections to alleviate the need for the user to have coding knowledge); (5) compiling, executing, and/or running the programming language code to create the user-defined data model; (6) feeding the input data into the user-defined data model created to model the input data and generate modeling results, or otherwise modeling the input data and generating the modeling results; and/or (7) displaying the modeling results, or other results generated by the user-defined data model acting upon the input data to facilitate modeling input data. The method may include additional, less, or alternate actions, including those discussed elsewhere herein.

In one implementation, the input data may be ratemaking input data, and the user selected variables may include claim frequency, claim severity, pure premium, or loss ratio, and the data model may be related to insurance. The input data may be ratemaking input data, and the user selected variables may include type of vehicle, make, model, vehicle age, driver age, or marital status, and the user-defined data model may be related to auto insurance.

The input data may be ratemaking input data, and the user selected variables may include autonomous or semi-autonomous vehicle feature, system, or technology, and the user-defined data model may be related to auto insurance. The input data may be ratemaking input data, and the user selected variables may include construction type, building age, or amount of insurance, and the user-defined data model may be related to homeowners insurance.

The input data may be ratemaking input data, and the user selected variables may include smart or intelligent home system, technology, or feature, and the user-defined data model may be related to homeowners insurance. The input data may be ratemaking input data, and the ratemaking input data and/or the user-defined data model may be related to auto, homeowners, pet, renters, life, health, commercial, personal articles, or other types of insurance.

In another aspect, a computer system configured to build a data model and then model input data may be provided. The computer system may include one or more processors, and/or a graphical user interface, configured to: (1) accept user input that identifies a file or folder from which to retrieve input data; (2) accept user input that identifies a file or folder to which store results generated from a user-defined data model created using user-selections acting upon the input data; (3) accept user selected variables or other selections (such as user selected icons or buttons) related to the user-defined data model to be created; (4) translate the user selected variables or other selections into a programming language code (such as object or source code) that can be compiled, executed, and/or run by the one or more processors to create the user-defined data model that is defined by the user selected variables or other selections (or otherwise create the programming language code from the user selected variables or other selections to alleviate the need for the user to have coding knowledge); (5) compile, execute, and/or run the programming language code to create the user-defined data model; (6) feed the input data into the user-defined data model created to model the input data and generate modeling results, or otherwise model the input data and generate modeling results; and/or (7) display the modeling results, or other results generated by the user-defined data model acting upon the input data to facilitate modeling input data. The system may include additional, less, or alternate functionality and/or componentry, including that discussed elsewhere herein.

In one implementation, the input data may be ratemaking input data, and the user selected variables may include claim frequency, claim severity, pure premium, or loss ratio, and the data model may be related to insurance, and/or the user selected variables may include type of vehicle, make, model, vehicle age, driver age, or marital status, and the user-defined data model may be related to auto insurance.

The input data may be ratemaking input data, and the user selected variables may include autonomous or semi-autonomous vehicle feature, system, or technology, and the user-defined data model may be related to auto insurance, and/or may include construction type, building age, or amount of insurance, and the user-defined data model may be related to homeowners insurance.

The input data may be ratemaking input data, and the user selected variables may include smart or intelligent home system, technology, or feature, and the user-defined data model may be related to homeowners insurance. Additionally or alternatively, the ratemaking input data and/or the user-defined data model may be related to auto, homeowners, pet, renters, life, health, commercial, personal articles, or other types of insurance.

In another aspect, a graphical user interface configured to facilitate building a data model and then model input data may be provided. The graphical user interface configured to: (1) accept user input that identifies a file or folder from which to retrieve input data; (2) accept user input that identifies a file or folder to which store results generated from a user-defined data model created using user-selections acting upon the input data; (3) accept user selected variables or other selections (such as user selected icons or buttons) related to the user-defined data model to be created; (4) display programming language code that can be compiled, executed, and/or run by one or more processors to create the user-defined data model that is defined by the user selected variables or other selections, the programming language code being generated or processor created by one or more processors using at least in part the user selected variables or other selections to alleviate the need for the user to have coding knowledge; and/or (5) display modeling results generated by the input data that is retrieved being feed into or otherwise analyzed by the user-defined data model created using the programming language code that is generated or otherwise processor created based at least in part upon the user selected variables or other selections, and/or other results generated by the user-defined data model acting upon the input data to facilitate modeling input data. The user interface may include additional, less, or alternate functionality, including that discussed elsewhere herein.

In one implementation, the input data may be ratemaking input data, and the user selected variables may include claim frequency, claim severity, pure premium, or loss ratio, and the data model may be related to insurance; type of vehicle, make, model, vehicle age, driver age, or marital status; and/or autonomous or semi-autonomous vehicle feature, system, or technology, and the user-defined data model may be related to auto insurance.

The input data may be ratemaking input data, and the user selected variables may include construction type, building age, or amount of insurance, and the user-defined data model may be related to homeowners insurance. The input data may be ratemaking input data, and the user selected variables may include smart or intelligent home system, technology, or feature, and the user-defined data model may be related to homeowners insurance. Additionally or alternatively, the input data may be ratemaking input data, and the ratemaking input data and/or the user-defined data model may be related to auto, homeowners, pet, renters, life, health, commercial, personal articles, or other types of insurance.

Additional Exemplary GLM Embodiments

In another aspect, a computer-implemented method in a computing device of enabling the management of data models may be provided. The method may include (1) generating, by a computer processor, a model build partition, including enabling a user to input, via a user interface: a storage location where a modeling output is to be stored; a set of variables to be binned; a set of identifications and/or user selections for modeling data, and/or a Generalized Linear Model (GLM) to be created and/or programmed by the computer processor; and/or a set of selections associated with (i) an exploratory data analysis (EDA), (ii) a variable selection, and/or (iii) a challenger model comparison; (2) generating, by the computer processor, the modeling output according to the model build partition; and/or (3) displaying, in the user interface, a set of results associated with generating the modeling output, the set of results including: (a) a set of model level results, and/or (b) a set of variable level results. The method may include additional, less, or alternate actions, including those discussed elsewhere herein.

In another aspect, a computer system for enabling the management of data models may be provided. The system may include: a user interface; a memory storing a set of computer-executable instructions; and/or a processor interfaced with the user interface and the memory, and configured to execute the computer-executable instructions to cause the processor to: (1) generate a model build partition, including enabling a user to input, via the user interface: a storage location where a modeling output is to be stored; a set of variables to be binned; a set of identifications and/or user selections for modeling data, and/or a Generalized Linear Model (GLM) to be created and/or programmed by the computer processor, and/or a set of selections associated with (i) an exploratory data analysis (EDA), (ii) a variable selection, and/or (iii) a challenger model comparison; (2) generate the modeling output according to the model build partition, and/or (3) cause the user interface to display a set of results associated with generating the modeling output, the set of results including: (a) a set model level results, and/or (b) a set of variable level results. The computer system may include additional, less, or alternate functionality, including that discussed elsewhere herein.

In another aspect, a computer-implemented method for building a Generalized Linear Model (GLM) model and then model ratemaking information may be provided. The method may include, via one or more processors: (1) accepting user input that identifies a file from which to retrieve ratemaking input data; (2) accepting user input that identifies a file to which store results generated from a user-defined GLM created using user-selections acting upon the ratemaking input data; (3) accepting user-selected variables related to the user-defined GLM to be created; (4) translating the user-selected variables into a programming language code that can be compiled, executed, and/or run by one or more processors to create the user-defined GLM that is defined by the user-selected variables; (5) executing the programming language code to create the user-defined GLM; (6) feeding the ratemaking input data into the user-defined GLM created to model the ratemaking input data and generate modeling results; and/or (7) displaying the modeling results to facilitate modeling ratemaking information. The method may include additional, less, or alternate actions, including those discussed elsewhere herein.

In another aspect, a computer system configured to build a Generalized Linear Model (GLM) model and then model ratemaking information may be provided. The computer system may include one or more processors, and/or a graphical user interface, configured to: (1) accept user input that identifies a file from which to retrieve ratemaking input data; (2) accept user input that identifies a file to which store results generated from a user-defined GLM created using user-selections acting upon the ratemaking input data; (3) accept user-selected variables related to the user-defined GLM to be created; (4) translate the user-selected variables into a programming language code that can be compiled, executed, and/or run by the one or more processors to create the user-defined GLM that is defined by the user-selected variables; (5) execute the programming language code to create the user-defined GLM; (6) feed the ratemaking input data into the user-defined GLM created to model the ratemaking input data and generate modeling results; and/or (7) display the modeling results to facilitate modeling ratemaking information. The computer system may include additional, less, or alternate functionality, including that discussed elsewhere herein.

In another aspect, a computer-implemented method of building a Generalized Linear Model (GLM) model and then model input data may be provided. The method may include, via one or more processors: (1) accepting user input that identifies a file from which to retrieve input data; (2) accepting user input that identifies a file to which store results generated from a user-defined GLM created using user-selections acting upon the input data; (3) accepting user-selected variables related to the user-defined GLM to be created; (4) translating the user-selected variables into a programming language code that can be compiled, executed, and/or run by one or more processors to create the user-defined GLM that is defined by the user-selected variables; (5) executing the programming language code to create the user-defined GLM; (6) feeding the input data into the user-defined GLM created to model the input data and generate modeling results; and/or (7) displaying the modeling results to facilitate modeling input data. The method may include additional, less, or alternate actions, including those discussed elsewhere herein.

Additional Exemplary GAM Embodiments

In one aspect, a computer-implemented method in a computing device of enabling the management of data models may be provided. The method may include (1) generating, by a computer processor, a model build partition, including enabling a user to input, via a user interface: a storage location where a modeling output is to be stored; a set of variables to be binned; a set of identifications and/or user selections for modeling data, and/or a Generalized Additive Model (GAM) to be created and/or programmed by the computer processor; and/or a set of selections associated with (i) an exploratory data analysis (EDA), (ii) a variable selection, and/or (iii) a challenger model comparison; (2) generating, by the computer processor, the modeling output according to the model build partition; and/or (3) displaying, in the user interface, a set of results associated with generating the modeling output, the set of results including: (a) a set of model level results, and/or (b) a set of variable level results. The method may include additional, less, or alternate actions, including those discussed elsewhere herein.

In another aspect, a computer system for enabling the management of data models may be provided. The method may include: a user interface; a memory storing a set of computer-executable instructions; and a processor interfaced with the user interface and the memory, and configured to execute the computer-executable instructions to cause the processor to: (1) generate a model build partition, including enabling a user to input, via the user interface: a storage location where a modeling output is to be stored; a set of variables to be binned; a set of identifications and/or user selections for modeling data, and/or a Generalized Additive Model (GAM) to be created and/or programmed by the computer processor; and/or a set of selections associated with (i) an exploratory data analysis (EDA), (ii) a variable selection, and/or (iii) a challenger model comparison; (2) generate the modeling output according to the model build partition, and/or (3) cause the user interface to display a set of results associated with generating the modeling output, the set of results including: (a) a set model level results, and/or (b) a set of variable level results. The computer system may include additional, less, or alternate functionality, including that discussed elsewhere herein.

In another aspect, a computer-implemented method for building a Generalized Additive Model (GAM) model and then model ratemaking information may be provided. The method may include, via one or more processors: (1) accepting user input that identifies a file from which to retrieve ratemaking input data; (2) accepting user input that identifies a file to which store results generated from a user-defined GAM created using user-selections acting upon the ratemaking input data; (3) accepting user-selected variables related to the user-defined GAM to be created; (4) translating the user-selected variables into a programming language code that can be compiled, executed, and/or run by one or more processors to create the user-defined GAM that is defined by the user-selected variables; (5) executing the programming language code to create the user-defined GAM; (6) feeding the ratemaking input data into the user-defined GAM created to model the ratemaking input data and generate modeling results; and/or (7) displaying the modeling results to facilitate modeling ratemaking information. The method may include additional, less, or alternate actions, including those discussed elsewhere herein.

In another aspect, a computer system configured to build a Generalized Additive Model (GAM) model and then model ratemaking information may be provided. The computer system may include one or more processors, and/or a graphical user interface, configured to: (1) accept user input that identifies a file from which to retrieve ratemaking input data; (2) accept user input that identifies a file to which store results generated from a user-defined GAM created using user-selections acting upon the ratemaking input data; (3) accept user-selected variables related to the user-defined GAM to be created; (4) translate the user-selected variables into a programming language code that can be compiled, executed, and/or run by the one or more processors to create the user-defined GAM that is defined by the user-selected variables; (5) execute the programming language code to create the user-defined GAM; (6) feed the ratemaking input data into the user-defined GAM created to model the ratemaking input data and generate modeling results; and/or (7) display the modeling results to facilitate modeling ratemaking information. The computer system may include additional, less, or alternate functionality, including that discussed elsewhere herein.

In another aspect, a computer-implemented method for building a Generalized Additive Model (GAM) model and then model input data may be provided. The method may include, via one or more processors: (1) accepting user input that identifies a file from which to retrieve input data; (2) accepting user input that identifies a file to which store results generated from a user-defined GAM created using user-selections acting upon the input data; (3) accepting user-selected variables related to the user-defined GAM to be created; (4) translating the user-selected variables into a programming language code that can be compiled, executed, and/or run by one or more processors to create the user-defined GAM that is defined by the user-selected variables; (4) executing the programming language code to create the user-defined GAM; (5) feeding the input data into the user-defined GAM created to model the input data and generate modeling results; and/or (6) displaying the modeling results to facilitate modeling input data. The method may include additional, less, or alternate actions, including those discussed elsewhere herein.

Additional Exemplary ELM Embodiments

In one aspect, a computer-implemented method in a computing device of enabling the management of data models may be provided. The method may include (1) generating, by a computer processor, a model build partition, including enabling a user to input, via a user interface: a storage location where a modeling output is to be stored; a set of variables to be binned; a set of identifications and/or user selections for modeling data, and/or an Ensemble Learning Method (ELM) to be created and/or programmed by the computer processor; and/or a set of selections associated with (i) an exploratory data analysis (EDA), (ii) a variable selection, and/or (iii) a challenger model comparison; (2) generating, by the computer processor, the modeling output according to the model build partition; and/or (3) displaying, in the user interface, a set of results associated with generating the modeling output, the set of results including: (a) a set of model level results, and/or (b) a set of variable level results. The method may include additional, less, or alternate actions, including those discussed elsewhere herein.

In another aspect, a computer system for enabling the management of data models may be provided. The computer system may include: a user interface; a memory storing a set of computer-executable instructions; and/or a processor interfaced with the user interface and the memory, and configured to execute the computer-executable instructions to cause the processor to: (1) generate a model build partition, including enabling a user to input, via the user interface: a storage location where a modeling output is to be stored; a set of variables to be binned; a set of identifications and/or user selections for modeling data, and/or an Ensemble Learning Method (ELM) to be created and/or programmed by the computer processor; and/or a set of selections associated with (i) an exploratory data analysis (EDA), (ii) a variable selection, and/or (iii) a challenger model comparison; (2) generate the modeling output according to the model build partition, and/or (3) cause the user interface to display a set of results associated with generating the modeling output, the set of results including: (a) a set model level results, and/or (b) a set of variable level results.

The computer system may include additional, less, or alternate functionality, including that discussed elsewhere herein.

In another aspect, a computer-implemented method for building an Ensemble Learning Method (ELM) model and then model ratemaking information may be provided. The method may include, via one or more processors: (1) accepting user input that identifies a file from which to retrieve ratemaking input data; (2) accepting user input that identifies a file to which store results generated from a user-defined ELM created using user-selections acting upon the ratemaking input data; (3) accepting user-selected variables related to the user-defined ELM to be created; (4) translating the user-selected variables into a programming language code that can be compiled, executed, and/or run by one or more processors to create the user-defined ELM that is defined by the user-selected variables; (5) executing the programming language code to create the user-defined ELM; (6) feeding the ratemaking input data into the user-defined ELM created to model the ratemaking input data and generate modeling results; and/or (7) displaying the modeling results to facilitate modeling ratemaking information. The method may include additional, less, or alternate actions, including those discussed elsewhere herein.

In another aspect, a computer system configured to build an Ensemble Learning Method (ELM) model and then model ratemaking information may be provided. The computer system may include one or more processors, and/or a graphical user interface, configured to (1) accept user input that identifies a file from which to retrieve ratemaking input data; (2) accept user input that identifies a file to which store results generated from a user-defined ELM created using user-selections acting upon the ratemaking input data; (3) accept user-selected variables related to the user-defined ELM to be created; (4) translate the user-selected variables into a programming language code that can be compiled, executed, and/or run by the one or more processors to create the user-defined ELM that is defined by the user-selected variables; (5) execute the programming language code to create the user-defined ELM; (6) feed the ratemaking input data into the user-defined ELM created to model the ratemaking input data and generate modeling results; and/or (7) display the modeling results to facilitate modeling ratemaking information. The computer system may include additional, less, or alternate functionality, including that discussed elsewhere herein.

In another aspect, a computer-implemented method of building an Ensemble Learning Method (ELM) model and then model input data may be provided. The method may include, via one or more processors: (1) accepting user input that identifies a file from which to retrieve input data; (2) accepting user input that identifies a file to which store results generated from a user-defined ELM created using user-selections acting upon the input data; (3) accepting user-selected variables related to the user-defined ELM to be created; (4) translating the user-selected variables into a programming language code that can be compiled, executed, and/or run by one or more processors to create the user-defined ELM that is defined by the user-selected variables; (5) executing the programming language code to create the user-defined ELM; (6) feeding the input data into the user-defined ELM created to model the input data and generate modeling results; and/or (7) displaying the modeling results to facilitate modeling input data. The method may include additional, less, or alternate actions, including those discussed elsewhere herein.

Additional Considerations

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

At various points herein, methods have been described as involving a first, second, and/or third block of a blockchain. It should be appreciated that the labels first, second, and third are used for ease of explanation and does not necessarily imply the involvement of multiple blocks. To this end, all transactions described as being included in a first, second, and/or third block may, in implementations, be included in just a single block of the blockchain.

Additionally, although the systems and methods described herein describe functionality at particular nodes of the blockchain, such descriptions are done for ease of explanation. To this end, any functionally described as occurring at two separate nodes may be implemented at a single node. Similarly, any functionality described as occurring at a single node, may be implemented across any number of nodes.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In some embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some exemplary embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

What is claimed:

1. A computer-implemented method in a computing device of enabling the management of data models, the method comprising:
   generating, by a computer processor, a model build partition, including enabling a user to input, via a user interface:
   a storage location where a modeling output is to be stored,
   a set of variables to be binned,
   a set of identifications for (1) at least one of a training dataset and a validation dataset, and (2) modeling data, and
   a set of selections associated with at least one of: (i) an exploratory data analysis (EDA), (ii) a variable selection, and (iii) a challenger model comparison;
   generating, by the processor, the modeling output according to the model build partition; and
   displaying, in the user interface, a set of results associated with generating the modeling output, the set of results including: (a) a set of model level results, and (b) a set of variable level results.

2. The computer-implemented method of claim 1, wherein enabling the user to input the set of variables to be binned comprises:
   enabling the user to input, for each of the set of variables, (i) a binning technique, (ii) a number of bins, and (iii) a binned value.

3. The computer-implemented method of claim 1, wherein generating the model build partition further includes:
   enabling the user to input, via the user interface, (i) a stratification selection, (ii) a sample percent, and (iii) a random seed.

4. The computer-implemented method of claim 1, wherein enabling the user to input the set of identifications for the modeling data comprises:
   enabling the user to input (i) a model type, (ii) a distribution, (iii) a link function, and (iv) a unique identifier.

5. The computer-implemented method of claim 1, wherein enabling the user to input the set of identifications for the modeling data comprises:
   enabling the user to input a target risk variable and a target exposure variable.

6. The computer-implemented method of claim 1, wherein enabling the user to input the set of selections associated with the exploratory data analysis (EDA) comprises:
   enabling the user to input whether to run the EDA using the training dataset and the validation dataset, or using the training dataset.

7. The computer-implemented method of claim 1, wherein enabling the user to input the set of selections associated with the variable selection comprises:
   enabling the user to input (i) whether to run the variable selection using the training dataset and the validation dataset, or using the training dataset, (ii) a set of model effects, and (iii) a set of variable selection techniques.

8. The computer-implemented method of claim 1, wherein displaying the set of model level results comprises:
   displaying, in the user interface, a set of prediction statistics.

9. The computer-implemented method of claim 1, wherein displaying the set of variable level results comprises:
   displaying, in the user interface, a set of main effects and a set of interaction relativity plots.

10. The computer-implemented method of claim 1, wherein the modeling output comprises a first model output and a second model output, and wherein the method further comprises:
   combining the first model output and the second model output using either an additive technique or a multiplicative technique.

11. A system for enabling the management of data models, comprising:
   a user interface;
   a memory storing a set of computer-executable instructions; and
   a processor interfaced with the user interface and the memory, and configured to execute the computer-executable instructions to cause the processor to:
   generate a model build partition, including enabling a user to input, via the user interface:
   a storage location where a modeling output is to be stored,
   a set of variables to be binned,
   a set of identifications for (1) at least one of a training dataset and a validation dataset, and (2) modeling data, and
   a set of selections associated with at least one of: (i) an exploratory data analysis (EDA), (ii) a variable selection, and (iii) a challenger model comparison,
   generate the modeling output according to the model build partition, and
   cause the user interface to display a set of results associated with generating the modeling output, the set of results including: (a) a set model level results, and (b) a set of variable level results.

12. The system of claim 11, wherein the set of variables to be binned comprises, for each of the set of variables, (i) a binning technique, (ii) a number of bins, and (iii) a binned value.

13. The system of claim 11, to generating the model build partition, the processor is further configured to:
   enable the user to input, via the user interface, (i) a stratification selection, (ii) a sample percent, and (iii) a random seed.

14. The system of claim 11, wherein the set of identifications for the modeling data comprises (i) a model type, (ii) a distribution, (iii) a link function, and (iv) a unique identifier.

15. The system of claim 11, wherein the set of identifications for the modeling data comprises a target risk variable and a target exposure variable.

16. The system of claim 11, wherein the set of selections associated with the exploratory data analysis (EDA) comprises whether to run the EDA using the training dataset and the validation dataset, or using the training dataset.

17. The system of claim 11, wherein the set of selections associated with the variable selection comprises (i) whether to run the variable selection using the training dataset and the validation dataset, or using the training dataset, (ii) a set of model effects, and (iii) a set of variable selection techniques.

18. The system of claim 11, wherein the set of model level results comprises a set of prediction statistics.

19. The system of claim 11, wherein the set of variable level results comprises a set of main effects and a set of interaction relativity plots.

20. The system of claim 11, wherein the modeling output comprises a first model output and a second model output, and wherein the processor is further configured to:
   combine the first model output and the second model output using either an additive technique or a multiplicative technique.

* * * * *